United States Patent
Li

(10) Patent No.: US 9,875,547 B2
(45) Date of Patent: Jan. 23, 2018

(54) METHOD AND APPARATUS FOR ADJUSTING STEREOSCOPIC IMAGE PARALLAX

(71) Applicant: SuperD Co. Ltd., Shenzhen (CN)

(72) Inventor: Gaofeng Li, Shenzhen (CN)

(73) Assignee: SUPERD CO. LTD., Shenzhen (CN)

( * ) Notice: Subject to any disclaimer, the term of this patent is extended or adjusted under 35 U.S.C. 154(b) by 213 days.

(21) Appl. No.: 14/747,293

(22) Filed: Jun. 23, 2015

(65) Prior Publication Data

US 2015/0373318 A1     Dec. 24, 2015

(30) Foreign Application Priority Data

Jun. 23, 2014   (CN) .......................... 2014 1 0284749

(51) Int. Cl.
*H04N 13/02*     (2006.01)
*G06T 7/00*      (2017.01)
*H04N 13/00*     (2006.01)

(52) U.S. Cl.
CPC ....... *G06T 7/0075* (2013.01); *H04N 13/0022* (2013.01); *H04N 2013/0081* (2013.01)

(58) Field of Classification Search
CPC .............. G06T 7/0075; H04N 13/0022; H04N 2013/0081
See application file for complete search history.

(56) References Cited

U.S. PATENT DOCUMENTS

| 5,175,616 | A | * | 12/1992 | Milgram | G03B 35/08 348/47 |
| 6,204,876 | B1 | * | 3/2001 | Uomori | G06T 15/10 348/47 |
| 9,336,603 | B2 | * | 5/2016 | Osamura | G06T 7/0075 |
| 2005/0253924 | A1 | * | 11/2005 | Mashitani | H04N 13/0275 348/42 |
| 2011/0254925 | A1 | * | 10/2011 | Ushiki | H04N 13/0022 348/46 |
| 2012/0306855 | A1 | * | 12/2012 | Aoyama | H04N 13/0454 345/419 |
| 2014/0036039 | A1 | * | 2/2014 | McNally | G06T 19/006 348/47 |
| 2014/0085423 | A1 | * | 3/2014 | Lee | H04N 13/0239 348/46 |

(Continued)

*Primary Examiner* — Joseph Suh
(74) *Attorney, Agent, or Firm* — Anova Law Group, PLLC

(57) ABSTRACT

The present invention provides a method for adjusting stereoscopic image parallax. An original camera is provided. A scene space corresponding to the original camera is preset, including presetting a depth range of the scene space. Preset viewing environment parameters for displaying stereoscopic images of a scene in the scene space are configured, including presetting a depth range of an actual view space. The method further includes establishing a mapping relationship between the depth range of the actual view space and the depth range of the scene space. According to the mapping relationship, the preset viewing environment parameters and the scene space, camera parameters for adjusting stereoscopic image parallax are calculated. The original camera is adjusted based on the camera parameters to capture the scene. Thus, the stereoscopic images of the scene can be generated and presented.

18 Claims, 12 Drawing Sheets

(56) References Cited

U.S. PATENT DOCUMENTS

| | | | |
|---|---|---|---|
| 2014/0184748 A1* | 7/2014 | Gharib | H04N 13/0246 348/46 |
| 2014/0321546 A1* | 10/2014 | Sakurai | H04N 13/0048 375/240.16 |
| 2015/0070467 A1* | 3/2015 | Crowder | G06T 5/10 348/46 |
| 2016/0007016 A1* | 1/2016 | Holliman | H04N 13/0022 348/54 |

* cited by examiner

METHOD AND APPARATUS FOR ADJUSTING STEREOSCOPIC IMAGE PARALLAX

CROSS-REFERENCES TO RELATED APPLICATIONS

This application claims the priority of Chinese Patent Application No. 201410284749.3, entitled "Method and Apparatus for Adjusting Stereoscopic Image Parallax", filed on Jun. 23, 2014, the entire content of which is incorporated herein by reference.

FIELD OF THE DISCLOSURE

The present disclosure relates to the field of image display technologies and, more particularly, relates to a method and an apparatus for adjusting stereoscopic image parallax

BACKGROUND

A stereoscopic display device may present three-dimensional (3D) visual effects to the audience by displaying left and right images having parallax after being captured in a filming scene. When human eyes perceive a pair of left image and right image, the human brain is sensitive to amount of parallax between certain scene image points in the left image and right image, and also requires the parallax to be in a certain range. When the parallax between the left and right image is small or near zero, a viewer may see the 3D image as being over-compressed along the depth direction or may not see 3D display effect. When the parallax between the left and right image is large for a large viewing area, the displayed images may be protruding or concaving too much, and severely stretched along the depth direction, causing viewing discomfort or even losing the 3D display effect.

Therefore, a present technical problem to be solved is how to confine the parallax value in a reasonable range so that a desired visual effect can be obtained. The disclosed method and system are directed to solve one or more problems set forth above and other problems.

BRIEF SUMMARY OF THE DISCLOSURE

One aspect of the present disclosure provides a method for adjusting stereoscopic image parallax. An original camera is provided. A scene space corresponding to the original camera is preset, including presetting a depth range of the scene space. Preset viewing environment parameters for displaying stereoscopic images of a scene in the scene space are configured, including presetting a depth range of an actual view space. The method further includes establishing a mapping relationship between the depth range of the actual view space and the depth range of the scene space. According to the mapping relationship, the preset viewing environment parameters and the scene space, camera parameters for adjusting stereoscopic image parallax are calculated. The original camera is adjusted based on the camera parameters to capture the scene. Thus, the stereoscopic images of the scene can be generated and presented.

Another aspect of the present disclosure provides an apparatus for adjusting stereoscopic image parallax. The parallax-adjusting apparatus includes a mapping relationship establishing unit configured to establish a mapping relationship between a depth range of an actual view space and a depth range of a scene space. An original camera is provided to capture a scene in the scene space. According to the mapping relationship, camera parameters are calculated for adjusting stereoscopic image parallax. Based on the camera parameters, the original camera is adjusted to capture the scene, such that stereoscopic images of the scene are correspondingly generated.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

Figure 1A:
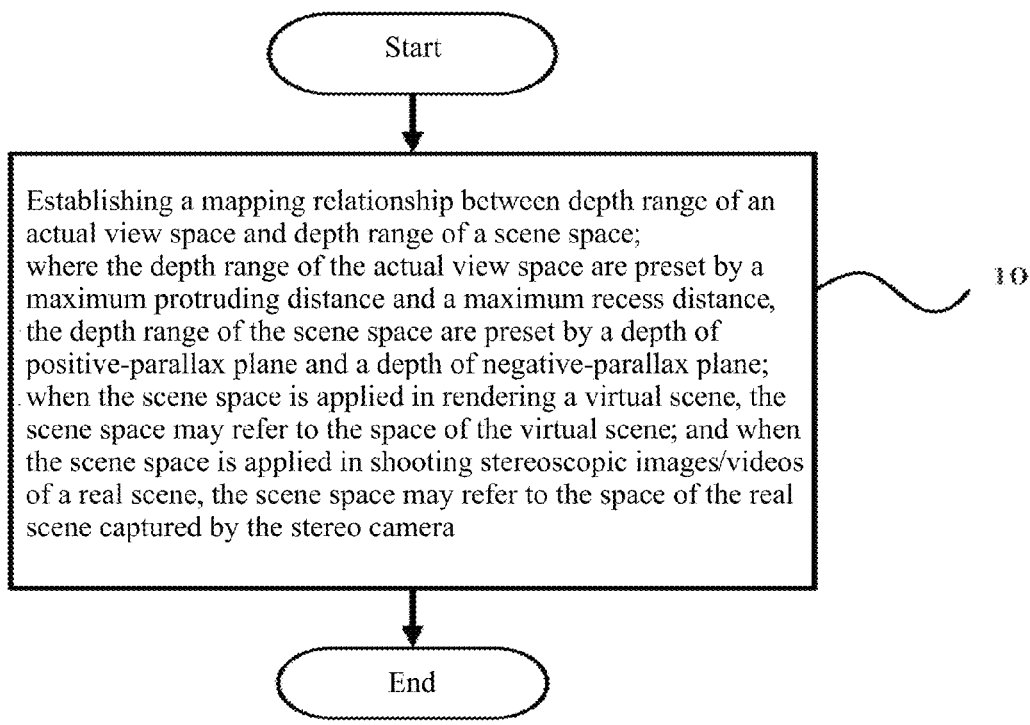
FIG. 1A and FIG. 1B illustrate two flow charts of an exemplary method for adjusting stereoscopic image parallax consistent with embodiments of the present disclosure.
Figure 1B:
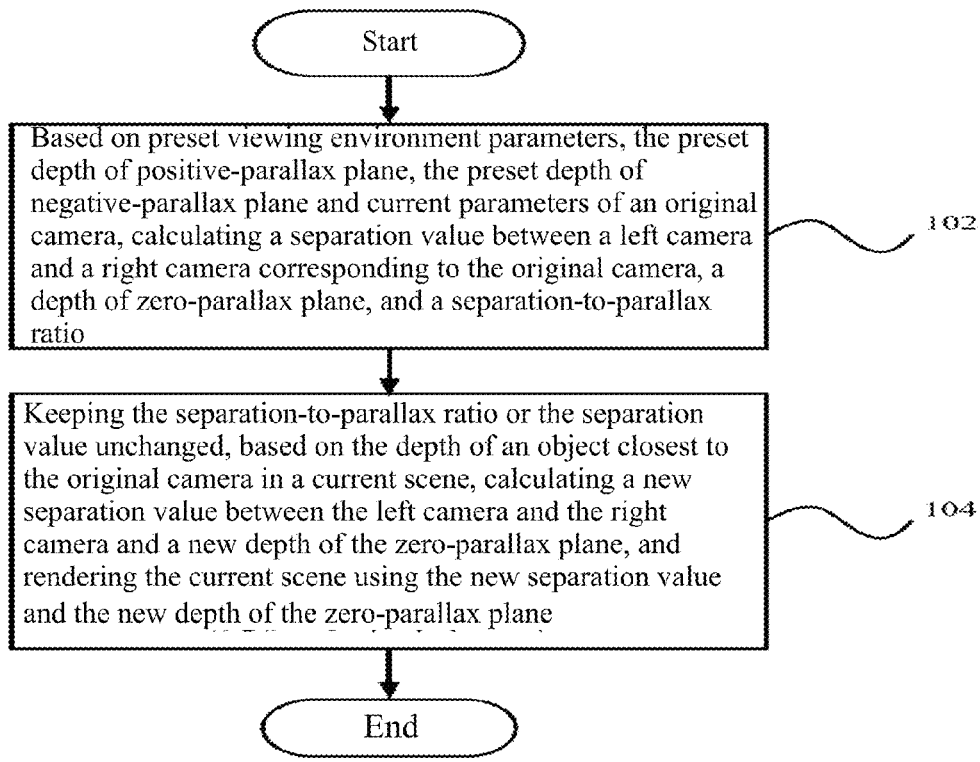

FIG. 1A and FIG. 1B illustrate two flow charts of an exemplary method for adjusting stereoscopic image parallax consistent with embodiments of the present disclosure;

As shown in FIG. 1A, the exemplary method for adjusting stereoscopic image parallax may include establishing a mapping relationship between depth range of an actual view space and depth range of a scene space (Step 10). The depth range of the actual view space may be preset by a maximum protruding distance and a maximum recess distance. The depth range of the scene space may be preset by a depth of positive-parallax plane and a depth of negative-parallax plane. When the scene space is applied in rendering a virtual scene, the scene space may refer to the space of the virtual scene. When the scene space is applied in shooting stereoscopic images/videos of a real-world scene, the scene space may refer to the space of the real-world scene captured by the stereo camera. The scene space may be captured by a virtual camera or a stereo camera, hereinafter, the scene space may also be referred to as camera space. The exemplary method may confine the parallax value in a desired range so that a desired display effect of stereoscopic images can be obtained.

A projection plane of the camera, usually rectangular, may define the horizontal and vertical boundaries of what the camera can capture. Further, the depth boundary of the camera may also be defined. When the projection plane is rectangular, a projection volume (i.e., view frustum) of the camera may be a pyramid with two clipping planes: the near projection plane (i.e., near clipping plane or near plane) and the far projection plane (i.e., far clipping plane or far plane). That is, in the camera space, all objects within the view frustum of the camera may be captured by the camera. When the camera is a virtual camera, the objects within the view frustum may be rendered for display. Objects or parts of objects found outside the frustum may not be rendered or captured.

A point P in the 3D camera space may be projected to the near projection plane by a projection transformation matrix. The projection transformation may introduce perspective and scaling on different objects in a scene. Without perspective, objects that are further away may appear larger than they should. The projection transformation makes objects that are further away appear smaller than they are and reduces objects that are sufficiently far away to single points or invisible ones. The projection transformation may exclude objects that are too close or outside the viewing angle. Further, the near projection plane may be normalized to a view plane.

In the disclosed embodiments, the actual view space may refer to a real-world three-dimensional space where a viewer is viewing stereo images/videos on a stereo display device. Specifically, center of a stereo display window of the stereo display device is assigned as the coordinate origin of the actual view space. Further, when the stereo display device is playing stereoscopic contents (e.g., images and videos), objects in the stereo contents may appear to be protruding out of the stereo display window or to be behind the stereo display window. The depth range of the actual view space may refer to the distance between a point in the most forefronts (i.e., maximum protruding distance) and a point in the furthest back (i.e., maximum recess distance) of the stereo display window.

As shown in FIG. 1B, in the above embodiment, the depth range of the actual view space may be preset by a maximum protruding distance (i.e., maximum pop-out distance) and a maximum recess distance (i.e., maximum deep-in distance). The depth range of the camera space may be preset by a depth of positive-parallax plane and a depth of negative-parallax plane. The above exemplary method may further include the following steps.

Step 102, based on preset viewing environment parameters, the preset depth of positive-parallax plane, the preset depth of negative-parallax plane and current parameters of an original camera, calculating a separation value between a left camera and a right camera corresponding to the original camera, a depth of zero-parallax plane, and a ratio between the separation value and the depth of zero-parallax plane (i.e., separation-to-parallax ratio). The separation value between the left camera and the right camera may be denoted as sep. The depth of the zero-parallax plane may be denoted as con. Further, hereinafter, the separation-to-parallax ratio may refer to the ratio between the separation value between the left camera and the right camera and the depth of zero-parallax plane in the camera space.

Step 104, keeping the separation-to-parallax ratio and the separation value unchanged, and based on the depth of an object closest to the original camera in a current scene, calculating a new separation value between the left camera and the right camera and a new depth of the zero-parallax plane. The current scene may be rendered using the new separation value and the new depth of the zero-parallax plane.

In the disclosed embodiments, when a camera moves in a scene space, the positional relationship between the camera and objects in the scene may change. If the preset zero-parallax plane is outside the near projection plane, when an object is gradually approaching the projection plane of the camera, positive parallax of the object may increase significantly, which may cause undesired viewing experience such as dizziness, eye fatigue and other symptoms. To address this issue, a desired parallax range may be set in advance. When the camera is moving, parallax value of the object closest to the camera is calculated. According to the parallax value of the closest object, the depth of zero-parallax plane and the separation value of the left and right cameras may be adjusted in real-time. Therefore, the parallax of the closest object may maintain in the preset parallax range such that desired and proper stereoscopic images can be generated to obtain a desired 3D visual effect.

Further, the left camera and the right camera are obtained by respectively moving the original camera to two sides in the horizontal direction. The position of the left camera is obtained by moving the original camera along the lateral vector in a negative direction for a distance of sep/2 unit (or half of the separation value). The position of the right camera is obtained by moving the original camera along the lateral vector in a positive direction for a distance of sep/2 unit. Other parameters of the left camera and the right camera are the same as the original camera. The other parameters related to a camera may include position of the camera, observation direction of the camera denoted as V, vertical vector of the camera pointing upwards denoted as UP, lateral vector of the camera denoted as N, etc.

Detailed definitions of the parallax, the separation value and the depth of zero-parallax plane, as used herein, may be given as follows.

When the left camera and the right camera capture a certain point in a current scene, a left image and a right image may be generated. The positions of such point in the left image and the right image may have a difference, and the position difference is called parallax. Only considering the horizontal direction, a point P in the captured scene may be imaged to be located at Lx and Rx in the left image and the right image, respectively, the parallax value may be equal to Lx−Rx. Positive parallax may refer to a parallax value greater than zero, and negative parallax may refer to a parallax value less than zero. Zero parallax may refer to a parallax value equals zero. Similarly, when a stereo display device is presenting stereoscopic contents to a viewer, an object in the contents may be seen at different locations by the left eye and the right eye of the viewer. Parallax value of the stereo display window may refer to the difference in image location of the object viewed by the two eyes of the viewer.

The separation value may refer to a lateral distance between the left camera and the right camera when capturing a scene in a real or virtual scene. The separation value is a one-dimensional value and may be denoted as sep. Hereinafter, unless otherwise specified, the separation value may refer to the distance between the left camera and the right camera.

The depth of zero-parallax plane (or distance to convergence plane) may refer to the distance between the camera and a tangent plane whose parallax value is zero when the current scene is projected on the left camera and right camera. The depth of zero-parallax plane may be denoted as con.

In certain embodiments, the preset viewing environment parameters may include a distance between a viewer and a stereo display window corresponding to a stereoscopic image, an interocular distance of the viewer (distance between the two eyes of the viewer), a width of the stereo display window, and the maximum protruding distance and the maximum recess distance of a desired stereo image.

In certain embodiments, specifically, step 102 may further include using a first preset algorithm to calculate a positive parallax value and a negative parallax value on the stereo display window based on the preset viewing environment parameters. The positive parallax value on the stereo display window is positively correlated with the preset maximum protruding distance and/or the interocular distance of the viewer. Further, the positive parallax value on the stereo display window is negatively correlated with a difference value obtained by subtracting the preset maximum protruding distance from the distance between the viewer and the stereoscopic images corresponding to the stereo display window. The negative parallax value on the stereo display window is positively correlated to the preset maximum recess distance and/or the interocular distance of the viewer. Further, the negative parallax value on the stereo display window is negatively correlated with the sum of the preset maximum recess distance and the distance between the viewer and the stereoscopic images corresponding to the stereo display window.

Moreover, a positive parallax value and a negative parallax value on the view plane may be calculated using a second preset algorithm based on the positive parallax value and the negative parallax value on the stereo display window. The positive parallax value on the view plane is positively correlated with the positive parallax value on the stereo display window, and is negatively correlated with the width of the stereo display window. The negative parallax value on the view plane is positively correlated with the negative parallax value on the stereo display window, and is negatively correlated with the width of the stereo display window.

The first preset algorithm may use the equations $$w1 = \frac{CS*e}{D-CS}, w2 = \frac{BS*e}{D+BS},$$

where D denotes the distance between the viewer and the stereoscopic image corresponding to the stereo display window, e denotes the interocular distance of the viewer, CS denotes the preset maximum protruding distance, BS denotes the preset maximum recess distance, w1 denotes the positive parallax value on the stereo display window, and w2 denotes the negative parallax value on the stereo display window.

Further, the second preset algorithm may use the equations $$Vw1 = \frac{2*w1}{Tw}, Vw2 = \frac{2*w2}{Tw},$$

where Vw1 denotes the positive parallax value on the view plane, Vw2 denotes the negative parallax value on the view plane, and Tw denotes the width of the stereo display window.

In the disclosed method, more specifically, based on the preset viewing environment parameters, the positive parallax value on the view plane corresponding to the maximum protruding distance in the real view space may be calculated, as well as the negative parallax value on the view plane corresponding to the maximum recess distance in the real view space. Further, according to the preset depth of positive-parallax plane and the preset depth of negative-parallax plane, objects located between the positive and negative parallax plane in the three-dimensional world may be rendered to satisfy requirements for maximum protruding and maximum recess display effects. In other words, the maximum positive-parallax plane and the maximum negative-parallax plane configure a depth range in the scene. By using algorithms, after rendering, protruding and recess effects of objects within the depth range can be bounded within a limited range set by the maximum protruding distance and the maximum recess distance.

In certain embodiments, the step 102 may further include using a third preset algorithm to calculate a ratio between the separation value and the depth of zero-parallax plane according to current parameters of the original camera, the preset depth of the positive-parallax plane and the preset depth of negative-parallax plane. The third preset algorithm may use the equation $$\text{ratio} = \frac{U}{\text{near}*\left(\frac{2*(z2-z1)}{Vw1*z1-Vw2*z2}-1\right)},$$

where ratio denotes the separation-to-parallax ratio, z1 denotes the preset depth of positive-parallax plane in the camera space, z2 denotes the preset depth of negative-parallax plane in the camera space, Vw1 denotes the positive parallax value on the view plane, Vw2 denotes the negative parallax value on the view plane, U denotes the width of the near projection plane of the original camera in the camera space, and near denotes the distance between the near projection plane of the original camera and the coordinate origin in the camera space.

Further, the depth of the zero-parallax plane in the camera space may be calculated based on the separation-to-parallax ratio using a fourth preset algorithm. The fourth preset algorithm may use the equation $$con = \frac{0.5 * Vw * U * z}{near * ratio} + 0.5 * Vw * z + z,$$

where con denotes the depth of zero-parallax plane, ratio denotes the separation-to-parallax ratio, U denotes the width of the near projection plane of the original camera in the camera space, and z denotes the preset depth of positive-parallax plane or the preset depth of negative-parallax plane.

Moreover, the depth of zero-parallax plane may be calculated based on the separation-to-parallax ratio and the depth of zero-parallax plane using a fifth preset algorithm. The fifth preset algorithm may use the equation $$ratio = \frac{sep}{con},$$

where ratio denotes the separation-to-parallax ratio, con denotes the depth of zero-parallax plane, and sep denotes the separation value.

In certain embodiments, step 104 may further include filtering all objects in a current scene according to object classifications. The objects within the projection volume of the original camera may be sorted according to the distances between the objects and the original camera. Objects between the near projection plane of the original camera and a preset true near plane may be excluded. A target object closest to the original camera may be determined. The depth of the target object may be calculated.

When an object is too close to the near projection plane, the generated parallax may be too large. After applying a fixed ratio algorithm to adjust the depth of positive-parallax plane, zero-parallax plane may approach the near projection plane (i.e., the depth of zero-parallax plane con approaches the value of near) so that only objects having a small magnitude of protruding effect may have positive parallax. In these embodiments, a true near clipping plane is configured, and objects between the true near clipping plane and the near projection plane of the camera are excluded. This step may avoid situations when the zero-parallax plane is too close to the near projection plane (i.e., con is approaching near) after self-adaptive adjustments. This step may provide a constraining method for producing protruding display effects for objects not too close to the camera in a virtual scene.

In one embodiment, the type of camera may include a virtual camera. When the original camera is a virtual camera, step 104 may further include comparing the depth of the target object and the preset depth of positive-parallax plane. When the depth of the target object is less than the depth of positive-parallax plane, the separation-to-parallax ratio is kept unchanged, and the depth of the target object is assigned as the preset depth of positive-parallax plane. According to the fourth preset algorithm and the fifth preset algorithm, a new separation value between the left and right cameras and a new depth of zero-parallax plane may be calculated. When the depth of the target object is greater than the depth of positive-parallax plane, the separation-to-parallax ratio is kept unchanged. Based on the preset depth of positive-parallax plane, the fourth preset algorithm and the fifth preset algorithm, a new separation value between the left and right cameras and a new depth of zero-parallax plane may be calculated.

In this embodiment, when the original camera is a virtual camera and an object is getting closer to the camera, the separation-to-parallax ratio may be maintained. According to the depth of an object closest to the camera, the separation value and the depth of zero-parallax plane may be recalculated. Further, the recalculated separation value and the recalculated depth of zero-parallax plane may be used to generate projection matrices for the left and right cameras, so that the left and right cameras may be used to render the scene. In this way, when the separation-to-parallax ratio is kept unchanged, an aspect ratio of the stereoscopic images may be kept unchanged. Therefore, the stereo display effect may be unchanged and viewing experience of the users may be enhanced.

In another modified embodiment, the camera type may include virtual camera. When the original camera is a virtual camera, step 104 may further include comparing the depth of the target object and the preset depth of positive-parallax plane. When the depth of the target object is less than the depth of positive-parallax plane, the separation value is kept unchanged. Using the depth of the target object as the preset depth of positive-parallax plane, according to a sixth preset algorithm with the equation sep=con*U*Vw*z/(−2*near*con+2*near*z+Vw*near*z), a new depth of zero-parallax plane may be calculated. The scene may be rendered using the separation value and the new depth of zero-parallax plane. When the depth of the target object is greater than the depth of positive-parallax plane, the scene may be directly rendered using the separation value and the depth of zero-parallax plane.

In this embodiment, when the original camera is a virtual camera, another method may be employed to recalculate the separation value and the depth of positive-parallax plane, which is keeping the separation value between the left and right cameras unchanged and recalculating the depth of zero-parallax plane. Further, the separation value and the recalculated depth of zero-parallax plane may be used to generate projection matrices of the left and right cameras, so that the left and right cameras may be used to render the scene. When the depth of the object closest to the camera is greater than the preset depth of positive-parallax plane, to ensure a desired 3D display effect, the initially calculated separation value and the depth of zero-parallax plane may be directly used to obtain the projection matrices of the left and the right cameras, thus the scene may be rendered using the left and right cameras.

In some other embodiments, the camera type may include a stereo camera. When the original camera is a stereo camera, step 104 may further include calculating a rotating angle between the left and right cameras and a z-axis of the original camera based on the separation-to-parallax ratio and a seventh preset algorithm. The rotating angle is positively correlated with the separation-to-parallax ratio. Further, the depth of the target object may be compared with the preset depth of positive-parallax plane. When the depth of the target object is less than the depth of positive-parallax plane, the separation value is kept unchanged. Using the depth of the target object as the preset depth of positive-parallax plane, according to the fifth preset algorithm and the sixth preset algorithm, a new separation-to-parallax ratio and a new depth of zero-parallax plane may be calculated. A new rotating angle may be calculated according to a seventh preset algorithm. The left and right cameras may be adjusted according to the new rotating angle.

The seventh preset algorithm may use the equation $\psi=0.5*ratio$, where $\psi$ denotes the rotating angle, and ratio denotes the separation-to-parallax ratio.

In this embodiment, when the original camera is a stereo camera, the separation value between the left and right cameras may be kept unchanged, and the depth of zero-parallax plane may be recalculated. The new separation-to-parallax ratio may be obtained based on the separation value and the recalculated depth of zero-parallax plane. Further, the separation-to-parallax ratio may be used to calculate the rotating angle between the left and right cameras and the z-axis of the original camera. Therefore, the stereo camera may be positioned according to the rotating angle, and thus generating desired stereoscopic images.

Optionally, in some embodiments, before step 104, the disclosed method may further include comparing the separation-to-parallax ratio and a preset ratio threshold. When the separation-to-parallax ratio is less than the preset ratio threshold, performing step 104 is allowed. When the separation-to-parallax ratio is greater than the preset ratio threshold, a reminder may be generated to reconfigure the preset viewing environment parameters, the preset depth of positive-parallax plane and/or the preset depth of negative-parallax plane.

In this embodiment, based on the preset viewing environment parameters, the preset depth of positive-parallax plane, the preset depth of negative-parallax plane, and current parameters of the original camera, the separation-to-parallax ratio may be calculated. When the separation-to-parallax ratio is greater than the preset ratio threshold, it may indicate that some preset values do not meet the requirements, thus users may be prompted to reconfigure the settings.

Figure 2:
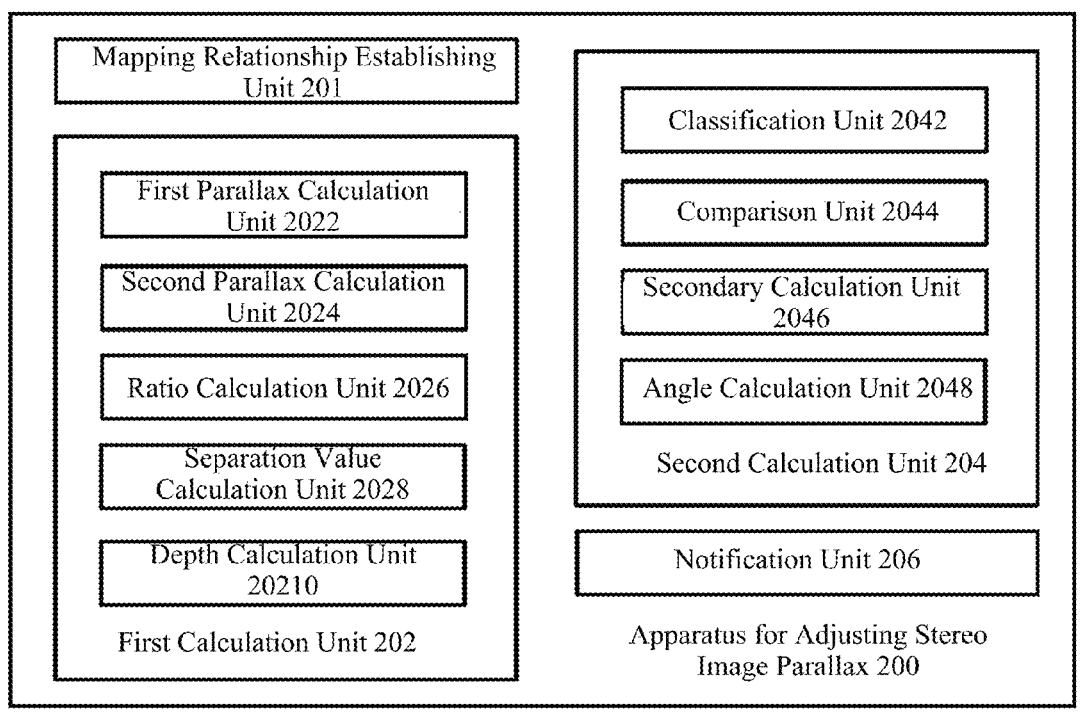
FIG. 2 illustrates a block diagram of an exemplary apparatus for adjusting stereoscopic image parallax consistent with embodiments of the present disclosure.

FIG. 2 illustrates a block diagram of an exemplary apparatus for adjusting stereoscopic image parallax consistent with embodiments of the present disclosure. As shown in FIG. 2, the exemplary parallax adjusting device 200 may include a mapping relationship establishing unit 201, a first calculation unit 202, a second calculation unit 204 and a notification unit 206. Certain units may be omitted and other units may be added.

The mapping relationship establishing unit 201 may be configured to establish a mapping relationship between depth range of an actual view space and depth range of a camera space. The depth range of the actual view space may be preset by a maximum protruding distance and a maximum recess distance. Depth range of the camera space may be preset by a depth of positive-parallax plane and a depth of negative-parallax plane. When the camera space is applied in rendering a virtual scene, the camera space may be a space of the virtual scene. When the camera space is used in shooting stereoscopic images/videos of a real-world scene, the camera space may be a space of the real-world scene captured by a stereo camera.

In the disclosed embodiments, the actual view space may refer to a real three-dimensional space where a viewer is viewing stereo images/videos on a stereo display device. More specifically, the center of a screen of the stereo display device is assigned as the coordinate origin of the actual view space.

Further, the first calculation unit 202 may be configured to calculate a separation value between a left camera and a right camera corresponding to the original camera, a depth of zero-parallax plane and a ratio between the separation value and the depth of zero-parallax plane, based on preset viewing environment parameters, the preset depth of positive-parallax plane, the preset depth of negative-parallax plane and current parameters of an original camera.

The second calculation unit 204 may be configured to keep the separation-to-parallax ratio or the separation value unchanged, and based on the depth of an object closest to the original camera in a current scene, to calculate a new separation value between the left camera and the right camera and a new depth of the zero-parallax plane. The current scene may thus be captured or rendered using the new separation value and the new depth of zero-parallax plane.

In the disclosed embodiments, when a camera moves in the camera space, the positional relationship between the camera and an object may change. If the preset zero-parallax plane is outside the near projection plane, when an object is gradually approaching the projection plane of the camera, positive parallax of the object may increase significantly, which may cause undesired viewing experience such as dizziness, eye fatigue and other symptoms. To address this issue, a desired parallax range may be set in advance. When the camera is moving, parallax value of the object closest to the camera is calculated. According to the parallax value of the closest object, the depth of zero-parallax plane and the separation value of the left and right cameras may be adjusted in real-time. Therefore, the parallax of the object may maintain in the preset parallax range such that desired and proper stereoscopic images can be generated to obtain a desired 3D visual effect.

In the disclosed embodiments, the left camera and the right camera are obtained by respectively moving the original camera to two sides in the horizontal direction. The position of the left camera is obtained by moving the original camera along the lateral vector in a negative direction for a distance of sep/2 unit (or half of the separation value). The position of the right camera is obtained by moving the original camera along the lateral vector in a positive direction for a distance of sep/2 unit. Other parameters of the left camera and the right camera are the same as the original camera. The other parameters related to a camera may include position of the camera, observation direction of the camera denoted as V, vertical vector of the camera pointing upwards denoted as UP, lateral vector of the camera denoted as N, etc.

In certain embodiments, the preset viewing environment parameters may include a distance between a viewer and a stereoscopic image corresponding to a stereo display window, an interocular distance of the viewer (distance between the two eyes of the viewer), a width of the stereo display window, and the maximum protruding distance and the maximum recess distance of a desired stereo image.

In certain embodiments, the first calculation unit 202 may further include a first parallax calculation unit 2022 and a second parallax calculation unit 2024. The first parallax calculation unit 2022 may be configured to apply a first preset algorithm to calculate a positive parallax value and a negative parallax value on the stereo display window based on the preset viewing environment parameters. In the first preset algorithm, the positive parallax value on the stereo display window is positively correlated with the preset maximum protruding distance and/or the interocular distance of the viewer. Further, the positive parallax value on the stereo display window is negatively correlated with a difference value obtained by subtracting the preset maximum protruding distance from the distance between the viewer and the stereoscopic images corresponding to the stereo display window. The negative parallax value on the stereo display window is positively correlated to the preset maximum recess distance and/or the interocular distance of the viewer. Further, the negative parallax value on the stereo display window is negatively correlated with the sum of the preset maximum recess distance and the distance between the viewer and the stereoscopic images corresponding to the stereo display window.

The second parallax calculation unit 2024 may be configured to apply a second preset algorithm to calculate a positive parallax value and a negative parallax value on the view plane based on the positive parallax value and the negative parallax value on the stereo display window. In the second preset algorithm, the positive parallax value on the view plane is positively correlated with the positive parallax value on the stereo display window, and is negatively correlated with the width of the stereo display window. The negative parallax value on the view plane is positively correlated with the negative parallax value on the stereo display window, and is negatively correlated with the width of the stereo display window.

In certain embodiments, the first preset algorithm may use the equations $$w1 = \frac{CS*e}{D-CS}, w2 = \frac{BS*e}{D+BS},$$

where D denotes the distance between the viewer and the stereoscopic image corresponding to the stereo display window, e denotes the interocular distance of the viewer, CS denotes the preset maximum protruding distance, BS denotes the preset maximum recess distance, w1 denotes the positive parallax value on the stereo display window, and w2 denotes the negative parallax value on the stereo display window.

Further, the second preset algorithm may use the equations $$Vw1 = \frac{2*w1}{Tw}, Vw2 = \frac{2*w2}{Tw},$$

where Vw1 denotes the positive parallax value on the view plane, Vw2 denotes the negative parallax value on the view plane, and Tw denotes the width of the stereo display window.

In the disclosed apparatus, more specifically, based on the preset viewing environment parameters, the positive parallax value on the view plane corresponding to the maximum protruding distance in the real view space may be calculated, as well as the negative parallax value on the view plane corresponding to the maximum recess distance in the real view space. Further, according to the preset depth of positive-parallax plane and the preset depth of negative-parallax plane, objects located between the positive and negative parallax plane in the three-dimensional world may be rendered to satisfy requirements for maximum protruding and maximum recess display effects. In other words, the maximum positive-parallax plane and the maximum negative-parallax plane configure a depth range in the scene. By using algorithms, after rendering, protruding and recess effects of objects within the depth range can be bounded within a limited range set by the maximum protruding distance and the maximum recess distance.

Optionally, in certain embodiments, the first calculation unit 202 may further include a ratio calculation unit 2026 configured to apply a third preset algorithm to calculate a ratio between the separation value and the depth of zero-parallax plane according to current parameters of the original camera, the preset depth of the positive-parallax plane and the preset depth of negative-parallax plane. The third preset algorithm may use the equation $$ratio = \frac{U}{near*\left(\frac{2*(z2-z1)}{Vw1*z1 - Vw2*z2} - 1\right)},$$

where ratio denotes the separation-to-parallax ratio, z1 denotes the preset depth of positive-parallax plane in the camera space, z2 denotes the preset depth of negative-parallax plane in the camera space, Vw1 denotes the positive parallax value on the view plane, Vw2 denotes the negative parallax value on the view plane, U denotes the width of a near projection plane of the original camera in the camera space, and near denotes the distance between the near projection plane of the original camera and the coordinate origin in the camera space.

Further, the first calculation unit 202 may further include a depth calculation unit 2028 configured to apply a fourth preset algorithm to calculate the depth of zero-parallax plane. The fourth preset algorithm may use the equation $$con = \frac{0.5*Vw*U*z}{near*ratio} + 0.5*Vw*z + z,$$

where con denotes the depth of zero-parallax plane, ratio denotes the separation-to-parallax ratio, U denotes the width of the near projection plane of the original camera in the observation space, and z denotes the preset depth of positive-parallax plane or the preset depth of negative-parallax plane.

Moreover, the first calculation unit 202 may further include a separation calculation unit 20210 configured to apply a fifth preset algorithm to calculate the separation value of the left camera and the right camera calculated based on the separation-to-parallax ratio and the depth of zero-parallax plane. The fifth preset algorithm may use the equation $$ratio = \frac{sep}{con},$$

where the separation-to-parallax ratio, con denotes the depth of zero-parallax plane, and sep denotes the separation value between the left camera and the right camera.

In certain embodiments, the second calculation unit 204 may further include a classification unit 2042 configured to filter all objects in a current scene according to object classifications. The classification unit 2042 may include an object exclusion unit and an object depth calculation unit. The object exclusion unit may be configured to sort the objects within the projection volume of the original camera according to the distance between the objects and the original camera, and exclude objects between the near projection plane and a preset true near plane. The object depth calculation unit may be configured to determine a target object closest to the original camera and to calculate the depth of the target object.

When an object is too close to the near projection plane, the generated parallax may be too large. After applying a fixed ratio algorithm to adjust the depth of positive-parallax plane, zero-parallax plane may approach the near projection plane (i.e., the value of con approaches the value of near) so that only objects having a small magnitude of protruding effect may have positive parallax. In these embodiments, a true near clipping plane is configured, and objects between the true near clipping plane and the near projection plane of the camera are excluded. This way, certain situations may be avoided when the depth of zero-parallax plane con is too close to the depth of the near projection plane near after self-adaptive adjustments. This step may provide a constraining method for producing protruding display effects for objects not too close to the camera in a virtual scene.

In one embodiment, the type of camera may include a virtual camera. When the original camera is a virtual camera, the second calculation unit 204 may further include a comparison unit 2044 and a secondary calculation unit 2046. The comparison unit 2044 may be configured to compare the depth of the target object and the preset depth of positive-parallax plane. The secondary calculation unit 2046 may be configured to keep the separation-to-parallax ratio unchanged, assign the depth of the target object as the preset depth of positive-parallax plane, and calculate a new separation value between the left and right cameras and a new depth of zero-parallax plane according to the fourth preset algorithm and the fifth preset algorithm when the depth of the target object is less than the depth of positive-parallax plane. Further, when the depth of the target object is greater than the depth of positive-parallax plane, the secondary calculation unit 2046 may be configured to keep the separation-to-parallax ratio unchanged and calculate a new separation value between the left and right cameras and a new depth of zero-parallax plane based on the preset depth of positive-parallax plane, the fourth preset algorithm and the fifth preset algorithm.

In this embodiment, when the original camera is a virtual camera and an object is getting closer to the camera, the separation-to-parallax ratio may be maintained. According to the depth of an object closest to the camera, the separation value and the depth of zero-parallax plane may be recalculated. Further, the recalculated separation value and the recalculated depth of zero-parallax plane may be used to generate projection matrices for the left and right cameras, so that the left and right cameras may be used to render the scene. In this way, when the separation-to-parallax ratio is kept unchanged, the stereoscopic images may be kept unchanged in the depth direction. Therefore, the stereo display effect may be unchanged and viewing experience of the users may be enhanced.

In another modified embodiment, the camera the camera type may include virtual camera. When the original camera is a virtual camera, the second calculation unit 204 may further include a comparison unit 2044 and a secondary calculation unit 2046. The comparison unit 2044 may be configured to compare the depth of the target object and the preset depth of positive-parallax plane. The secondary calculation unit 2046 may be configured to keep the separation value unchanged when the depth of the target object is less than the depth of positive-parallax plane, and to use the depth of the target object as the preset depth of positive-parallax plane for calculating a new depth of zero-parallax plane according to a sixth preset algorithm. The sixth preset algorithm may use the equation sep=con*U*Vw*z/(−2*near*con+2*near*z+Vw*near*z). The scene may be rendered using the separation value and the new depth of zero-parallax plane. Further, when the depth of the target object is greater than the depth of positive-parallax plane, the scene may be directly rendered using the separation value and the depth of zero-parallax plane.

In this embodiment, when the original camera is a virtual camera, another method may be employed to recalculate the separation value and the depth of positive-parallax plane, which is keeping the separation value between the left and right cameras unchanged and recalculating the depth of zero-parallax plane. Further, the separation value and the recalculated depth of zero-parallax plane may be used to generate projection matrices of the left and right cameras, so that the left and right cameras may be used to render the scene. When the depth of the object closest to the camera is greater than the preset depth of positive-parallax plane, to ensure a desired 3D display effect, the previously calculated separation value and the depth of zero-parallax plane may be directly used to obtain the projection matrices of the left and the right cameras, thus the scene may be rendered using the left and right cameras.

In some other embodiments, the camera type may include a stereo camera. When the original camera is a stereo camera, the second calculation unit 204 may further include an angle calculation unit 2048 and a secondary calculation unit 2046. The angle calculation unit 2044 may be configured to calculate a rotating angle between the left and right cameras and a z-axis of the original camera based on the separation-to-parallax ratio and a seventh preset algorithm, and to compare the depth of the target object and the preset depth of positive-parallax plane. The rotating angle is positively correlated with the separation-to-parallax ratio. The secondary calculation unit 2046 may be configured to keep the separation value unchanged when the depth of the target object is less than the depth of positive-parallax plane, to use the depth of the target object as the preset depth of positive-parallax plane, and to calculate a new separation-to-parallax ratio and a new depth of zero-parallax plane according to the fifth preset algorithm and the sixth preset algorithm. The secondary calculation unit 2046 may further calculate a new rotating angle according to the seventh preset algorithm. The left and right cameras may be adjusted according to the new rotating angle.

The seventh preset algorithm may use the equation $\psi=0.5*\text{ratio}$, where $\psi$ denotes the rotating angle, and ratio denotes the separation-to-parallax ratio.

In this embodiment, when the original camera is a stereo camera, the separation value between the left and right cameras may be kept unchanged, and the depth of zero-parallax plane may be recalculated. The new separation-to-parallax ratio may be obtained based on the separation value and the recalculated depth of zero-parallax plane. Further, the separation-to-parallax ratio may be used to calculate the rotating angle between the left and right cameras and the z-axis of the original camera. Therefore, the stereo camera may be positioned according to the rotating angle, and thus generating desired stereoscopic images.

Optionally, in some embodiment, the disclosed apparatus may further include a reminder unit 206 configured to compare the separation-to-parallax ratio and a preset ratio threshold, and to permit the second calculation unit 204 to operate when the separation-to-parallax ratio is less than the preset ratio threshold. When the separation-to-parallax ratio is greater than the preset ratio threshold, the reminder unit 206 may generate a reminder to reconfigure the preset viewing environment parameters, the preset depth of positive-parallax plane and/or the preset depth of negative-parallax plane.

In this embodiment, based on the preset viewing environment parameters, the preset depth of positive-parallax plane, the preset depth of negative-parallax plane, and current parameters of the original camera, the separation-to-parallax ratio may be calculated. When the separation-to-parallax ratio is greater than the preset ratio threshold, it may indicate that some preset values do not meet the requirements, thus users may be prompted to reconfigure the settings.

Referring to FIGS. 3A to 3H, detailed explanations of the disclosed embodiments are given in the following descriptions.

The left camera and the right camera may be used to perform two renderings to generate left images and right images with parallax. The left and right images may be processed with image layout algorithms and presented to the viewers in a stereo display device. Current stereo display techniques mainly include filter technology, parallax barrier technology, and lenticular lens technology. The filter technology may require the viewers to wear red-blue or red-green filtered glasses. The latter two technologies belong to naked eye 3D technologies (Autostereoscopy). Regardless of what technology is applied, to present a desired 3D display effect, it may need to control the initial parallax between the left and right images. Changing related settings of the camera may address this issue. Using a 3D scene rendered and displayed by lenticular lens technology as an example, factors affecting 3D display effects are discussed, and methods for adjusting stereo image parallax are given in the following descriptions.

Figure 3A:
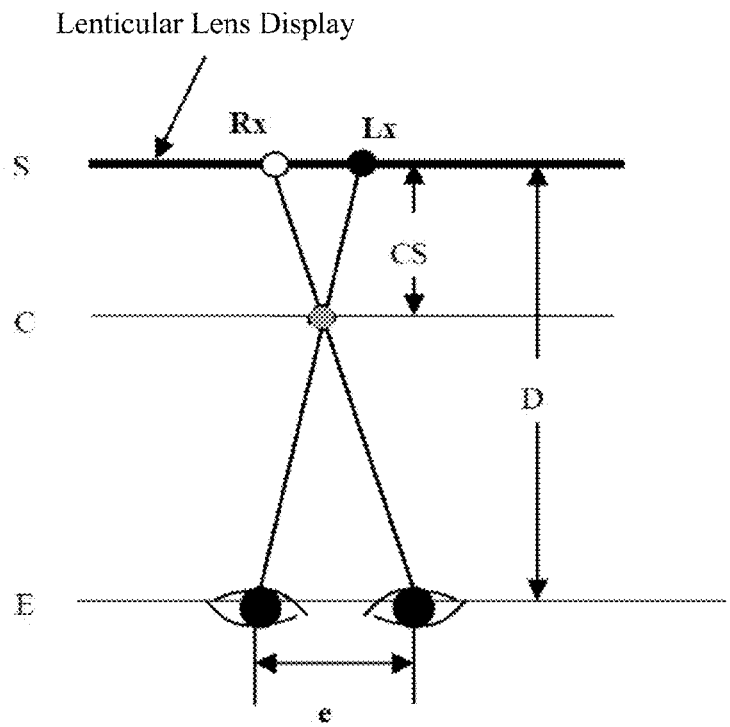
FIGS. 3A, 3B, 3C, 3D, 3E, 3F, 3G and 3H illustrate principles of an exemplary method for adjusting stereoscopic image parallax consistent with embodiments of the present disclosure.
Figure 3B:
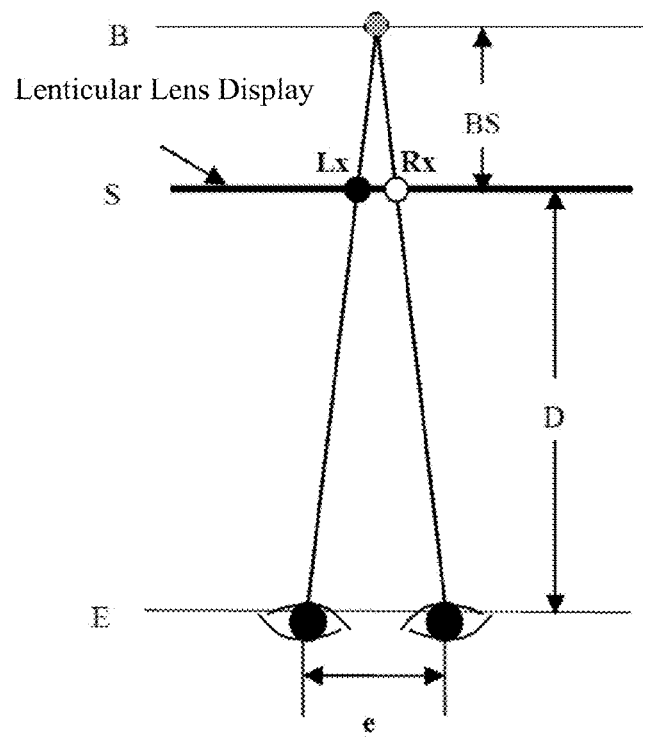

As shown in FIGS. 3A and 3B, the distance between a viewer and a display screen (or display window) is denoted as D. In a displayed virtual scene, a point P may have a projection in the left image at a position denoted as Lx, and have a projection in the right image at a position denoted as Rx. The parallax value is denoted as w, and w=Lx−Rx. FIG. 3A illustrates a positive parallax situation, and FIG. 3B illustrates a negative parallax situation. When there is a positive parallax, the stereo images may appear to be protruding out of the screen. When there is a negative parallax, the stereo images may appear to be behind the screen (recess display effect). Further, CS denotes maximum protruding distance and should be assigned with a positive value, and BS denotes maximum recess distance and should be assigned with a negative value. Provided that the interocular distance of the viewer (i.e., distance between left eye and right eye of the viewer) is given and denoted as e, w1 denotes positive parallax value on the stereo display window, and w2 denotes the negative parallax on the stereo display window, the following equations (1) and (2) may be obtained.

$$\text{Positive parallax: } w1 = \frac{CS * e}{D - CS} \quad (1)$$

$$\text{Negative parallax: } w2 = \frac{BS * e}{D + BS} \quad (2)$$

Field tests demonstrate that it is acceptable for viewers when a ratio between the protruding/recess distance and the distance to the display screen D is less than 25%. Comparing to protruding effects, recess effects may cause less undesired viewing experience. The threshold given here may be directed to a general circumstance. In special occasions, this parameter may have larger values. According to the previous analysis, using given values of CS and BS may reverse deduct the values of w (e.g., w1 and w2), thus establishing connections with related parameters in the virtual scene.

Figure 3C:
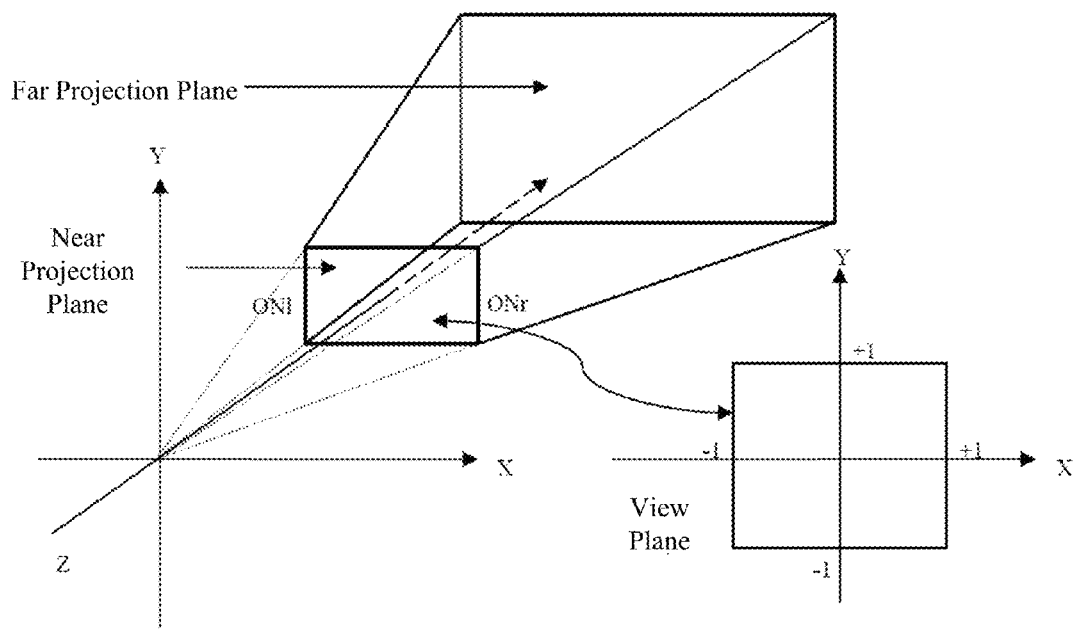

FIG. 3C illustrates an exemplary rendering process of a point P in the scene space. The following only describes how position information is processed. Vp denotes coordinates of the point P in the camera space. Vp' denotes coordinates when the point P is projected to the near projection plane and can be calculated by equation (3).

$$Vp'=Vp*\text{projection matrix} \quad (3)$$

As shown in FIG. 3C, the near projection plane may be normalized to a view plane V having a width range from −1 to +1 and a height range from −1 to +1.

Figure 3D:
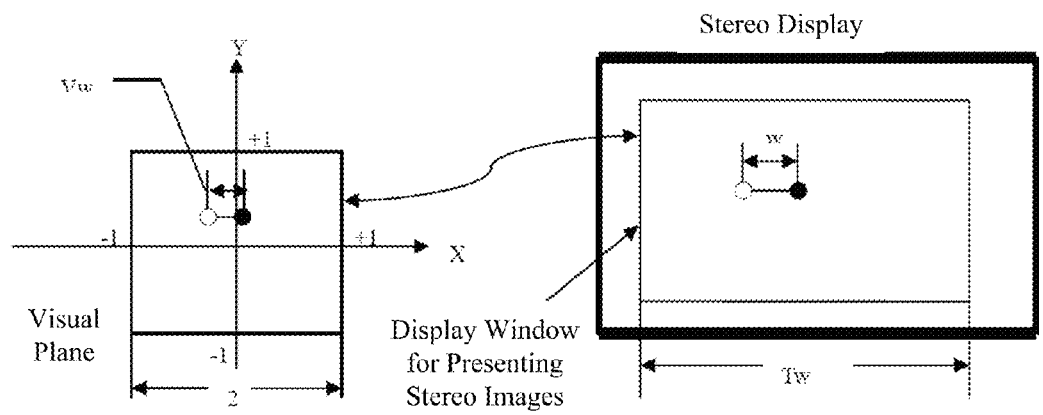

FIG. 3D illustrates the projection relationship between the view plane V and the stereo display window. Provided that a point has a parallax value on the stereo display window denoted as w and a parallax value on the view plane denoted as Vw, and the physical width of the stereo display window is Tw, because the commonly used width of the view plane is 2, the following equation (4) may be deducted.

$$Vw = \frac{2 * w}{Tw} \quad (4)$$

In order to generate left and right images with parallax, a method of focusing and projecting on the center of the convergence plane may be implemented. This method may avoid generating vertical parallax and, to a large extent, avoid differences in shooting ranges of the camera when capturing the scenes, which may currently be a most desired method to generate the left and right images.

Figure 3E:
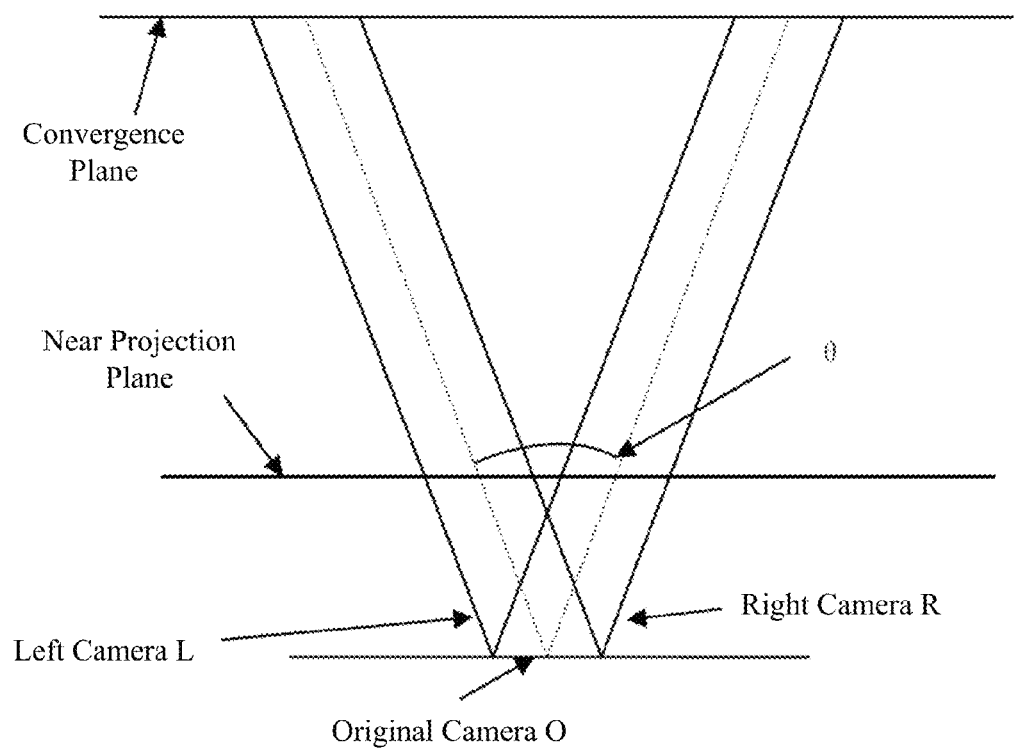
Figure 3F:
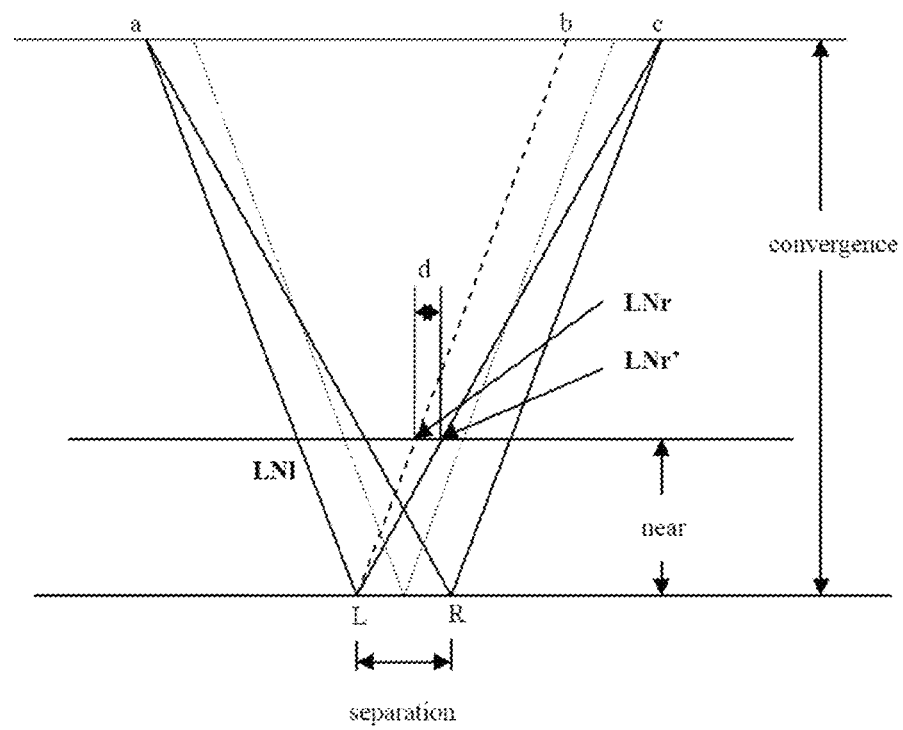

FIGS. 3E and 3F illustrate geometric principles of this method. The original camera may be a target camera that the user can provide inputs and controls. The left camera and the right camera may be originated from the original camera. To ensure the left camera and the right camera to have the same convergence plane, horizontal angles of view of the left and right cameras may be adjusted accordingly. The horizontal angle of view (i.e., field of view angle) may be denoted as θ.

Using the left camera as an example, the relationships between various parameters may be deducted. The position of the original camera is denoted as O. The position of the left camera is denoted as L. The left boundary of the near projection plane of the original camera is denoted as ONl, and the right boundary of the near projection plane of the original camera is denoted as ONr. The left boundary of the near projection plane of the left camera is denoted as LNl, and the right boundary of the near projection plane of the left camera is denoted as LNr'. The extended portion is denoted as d. The right boundary of the near projection plane of the left camera before the angle adjustment is denoted as LNr. Similarly, the left boundary of the near projection plane of the right camera is denoted as RNl, and the right boundary of the near projection plane of the right camera is denoted as RNr.

The following projection transform matrix may provide a solution to parameter relationships illustrated in FIG. 3F. The corresponding projection matrices for the original camera and the left camera may be deducted as follows (similar principles may be used for calculating the projection matrix for the right camera). In the projection matrices, far may denote depth of the far projection plane, top may denote the top boundary of the projection plane, and bottom may denote the bottom boundary of the projection plane, $$OProj = \begin{bmatrix} \frac{2*\text{near}}{ONr-ONl} & 0 & 0 & 0 \\ 0 & \frac{2*\text{near}}{\text{top}-\text{bottom}} & 0 & 0 \\ \frac{ONr+ONl}{ONl-ONr} & \frac{\text{top}+\text{bottom}}{\text{bottom}-\text{top}} & \frac{\text{far}}{\text{far}-\text{near}} & 1 \\ 0 & 0 & \frac{\text{near}*\text{far}}{\text{near}-\text{far}} & 0 \end{bmatrix}$$

$$LProj = \begin{bmatrix} \frac{2*\text{near}}{LNr-LNl} & 0 & 0 & 0 \\ 0 & \frac{2*\text{near}}{\text{top}-\text{bottom}} & 0 & 0 \\ \frac{LNr+LNl}{LNl-LNr} & \frac{\text{top}+\text{bottom}}{\text{bottom}-\text{top}} & \frac{\text{far}}{\text{far}-\text{near}} & 1 \\ 0 & 0 & \frac{\text{near}*\text{far}}{\text{near}-\text{far}} & 0 \end{bmatrix}$$

The following expressions may be deducted.

$$d = \text{near}*sep/con \tag{5}$$

$$LNl = ONl \tag{6}$$

$$LNr = ONr + d \tag{7}$$

$$RNl = ONl - d \tag{8}$$

$$RNr = ONr \tag{9}$$

where sep>0, and con>0.

Further, after projected by the left and right camera, the parallax value of the point P may be deducted. As shown in FIG. 3C, the rendering process may eventually map the near projection plane to a rectangular plane within the range in [x|−1≤x≤+1; y|−1≤y≤+1] (i.e., the view plane V). The horizontal parallax corresponds to the value on the x-axis of the view plane. The x-axis value of the point P in the view plane of the left camera is denoted as LVx. Similarly, the x-axis value of the point P in the view plane of the right camera is denoted as RVx. The parallax value is denoted as Vw.

The parallax value may be calculated as follows. In the coordinate system of the original camera, the position of point P may be denoted as P=(x,y,z,1). In the coordinate system of the left camera, the position of point P in the view plane may be denoted as Lp=(x+sep/2,y,z,1). In the coordinate system of the right camera, the position of point P in the view plane may be denoted as Rp=(x−sep/2,y,z,1). Because the (1,0) entry of the projection matrix is 0, and only the x-axis component is considered after transformation, the coordinates may be simplified as Lp=(x+sep/2,0,z,1), Rp=(x−sep/2,0,z,1). Further, removing x in the equations may obtain Lp=(sep/2,0,z,1), Rp=(−sep/2,0,z,1).

Therefore, we have Lp'=Lp*LProj and Rp'=Rp*RProj, and the following equations can be deducted.

$$LVx = \left(\frac{\text{sep}*\text{near}}{ONr-ONl+d} + \frac{z*d}{ONl-ONR-d}\right)*1/z \tag{10}$$

$$RVx = \left(\frac{-\text{sep}*\text{near}}{ONr-ONl+d} + \frac{-z*d}{ONl-ONR-d}\right)*1/z \tag{11}$$

Equations (10) and (11) are divided by z to normalize the results between −1 to +1. It may be deducted that the calculated parallax value of a certain point is only related to its z value in the camera space, regardless of the values of x and y components.

Applying equations (5), (6), (7), (8), (9) into equations (10) and (11), it should be noted that LNr−LNl is equal to RNr−RNl. Assigning U=ONr−ONl, where ONr and ONl is the x-axis value of the left and right boundary of the near projection plane of the original camera. The value of U may be obtained by a given horizontal angle of view θ of the original camera and the distance between the near projection plane and the original camera near.

$$U = 2*\tan\left(\frac{\theta}{2}\right)*\text{near} \tag{12}$$

The parallax value of point P may be deducted in the following equation.

$$Vw = \frac{2*\text{near}*\text{sep} - 2*d*z}{(U+d)*z} \tag{13}$$

The parallax here is calculated by LVx−RVx, which is different from the parallax in FIGS. 3A and 3B. LVx−RVx (i.e., parallax on the view plane) and Lx−Rx (i.e., parallax on the stereo display window) may be related by equation (4).

FIG. 3D illustrated the relationships between LVx−RVx and Lx−Rx. As shown in FIG. 3D, images on the view plane of the left and right cameras may be outputted to a physical area in the stereo display window, and corresponds to either the whole display screen or a certain part of the display screen.

Figure 3G:
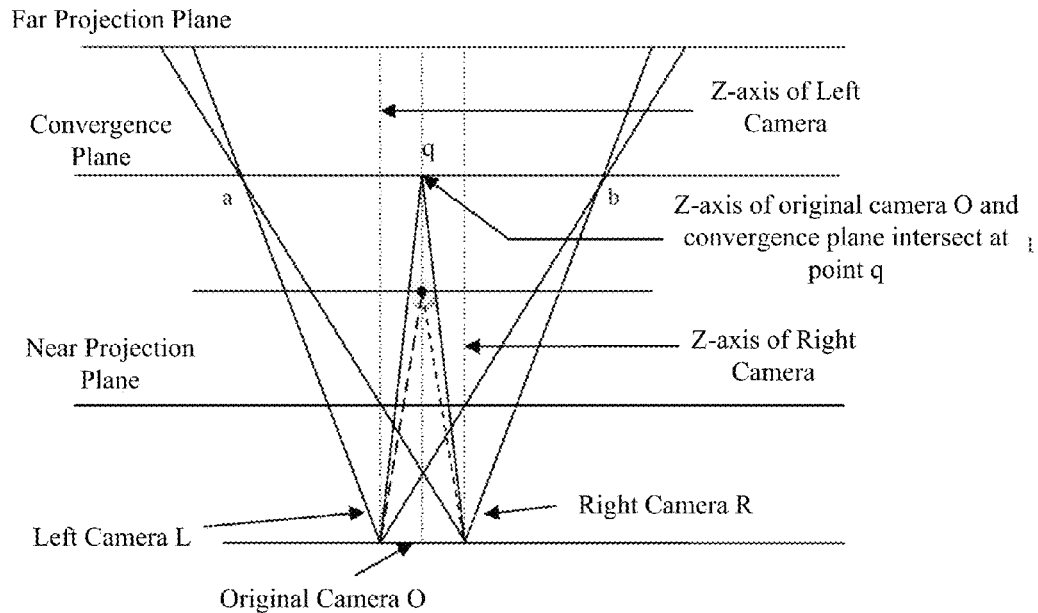

As shown in FIG. 3G, the z-axis of the original camera and the convergence plane may intersect at a point q. The position of q on the corresponding view planes of the left camera and the right camera may be calculated by applying coordinates of q into equation (13). The numerator in equation (13) is zero, thus the result indicates a zero parallax.

Figure 3H:
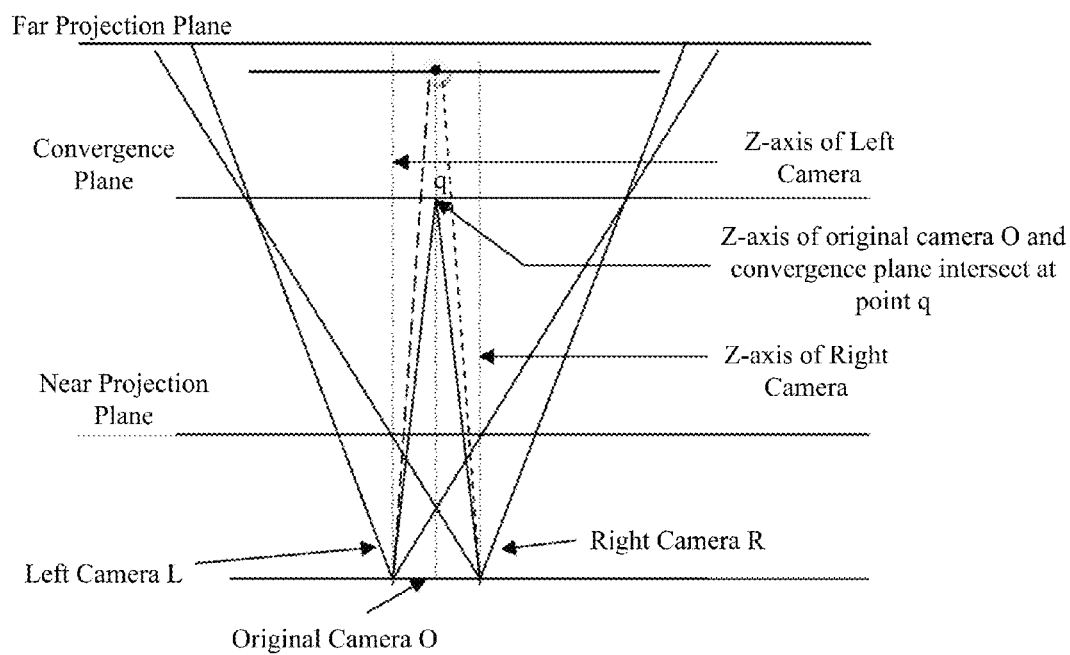

As shown in FIGS. 3G and 3H, when the point P is between the convergence plane and the far projection plane including the far projection plane, a negative parallax is produced (the parallax value Vw<0), and P may have an inward display effect and appear to be behind the screen. When the point P is between the convergence plane and the near projection plane, a positive parallax is produced (the parallax value Vw>0), and P may appear to have an outward display effect and appear to be protruding out of the screen. These geometric analyses are given for intuitive and illustrative purposes. All these deductions may be obtained from equation (13).

The following descriptions may establish equations for constraining the parallax value. When applying the method of focusing and projecting to the convergence plane, and when the preset horizontal angle of view of the camera is too large, captured images may have significant distortions on the horizontal direction, which may give people a unreal sense of object scales in the space. Controlling the horizontal angle of view within 45 degrees may avoid or significantly reduce distortions in the horizontal direction.

Further, according to FIG. 3F and equation (5) (i.e., d=near*sep/con), it can be deducted that the width of the near projection plane of the left and right cameras may have an increment d comparing to the width U of the near projection plane of the original camera. When the ratio between the increment d and the width U exceeds a certain range, aspect ratio of the objects may be imbalanced, and the objects may appear to be distorted.

In addition, when the ratio between the increment d and the width U is too large, the objects may be over stretched in the depth direction. Therefore, the value of d should be constrained in a certain range. When the horizontal angle of view of the original camera is given, according to equation (12), the distance between the near projection plane and the original camera near and the width of the near projection plane of the original camera U are proportional to each other. Therefore, the increment d can be limited by just constraining the separation-to-parallax ratio ratio=sep/con. Other than the limitations on the positive parallax value and the negative parallax value, a third constraint is denoted as ratio, and the upper threshold is denoted as R.

Because everyone may adapt differently to stereo images, according to practical test results, the value of ratio may generally be limited to less than 0.1 for a desired 3D display effect.

Further, regardless of how the values of the separation value sep and the depth of zero-parallax plane con change, when their ratio is not changed, the horizontal angles of view of the left and right cameras are unchanged.

Applying the expression sep=ratio*con into equation (13) to establish a solvable equation. Equation (13) may be rewritten as $$Vw = \frac{2*near*con*ratio - 2*near*z*ratio}{U*z + near*z*ratio} \quad (14)$$

According to previous analysis, a pair of desired positive parallax and negative parallax on the view plane may be obtained based on the maximum protruding distance and maximum recess distance in the actual viewing environment. The parallax on the view plane Vw may be obtained using equation (4) Vw=2*w/Tw. The positive parallax may be denoted as Vw1, the negative parallax may be denoted as Vw2. Further, provided that point P1=(x1, y1, z1) has the maximum positive parallax, and point P2=(x2, y2, z2) has the maximum negative parallax Vw2, where z2 is greater than z1. The two points may be applied to equation (14) respectively.

Applying Vw1 and z1 to equation (14) may obtain equation (15).

$$Vw1*z1*(U+Near*Ratio)=2*near*con*ratio-2*near*ratio*z1 \quad (15)$$

Applying Vw2 and z2 to equation (14) may obtain equation (16.)

$$Vw2*z2*(U+near*ratio)=2*near*con*ratio-2*near*ratio*z2 \quad (16)$$

Subtracting equation (16) from equation (15) may obtain equation (17).

$$ratio = \frac{U}{near*\left(\frac{2*(z2-z1)}{Vw1*z1-Vw2*z2}-1\right)} \quad (17)$$

In equation (17), near denotes the distance between the near projection plane of the camera and the coordinate origin of the observation space, U denotes the width of the near projection plane of the original camera in the observation space.

Equation (14) may be used to deduct and calculate the depth of zero-parallax plane con as shown in equation (18).

$$con = \frac{0.5*Vw*U*z}{near*ratio} + 0.5*Vw*z + z \quad (18)$$

Therefore, equation (17) may be used to calculate the separation-to-parallax ratio. Further, applying ratio to equation (18) may obtain the depth of zero-parallax plane con. In this way, a mapping relationship between the protruding and recess distance of actual display effects and proper values of the depth of zero-parallax plane con and the separation value sep may be established.

Referring to equation (17), U/near is equal to $$2*\tan\left(\frac{\theta}{2}\right),$$

thus the separation-to-parallax ratio ratio is related to the horizontal angle of view of the camera. Further, referring to equation (18), the depth of zero-parallax plane con is also related to the horizontal angle of view of the camera. Therefore, it may be concluded that when the horizontal angle of view of the camera is fixed, the depth of zero-parallax plane con and the separation value sep may only depend on the positive parallax threshold Vw1, the negative parallax threshold Vw2, the maximum protruding position of the scene z1 and the maximum recessing position of the scene z2.

Further, equations (17) and (18) may also be used when operating stereo cameras. Provided that Vw1, Vw2, z1, z2 and the horizontal angle of view θ of the camera are given, desired separation value sep and desired depth of zero-parallax plane con for the stereo camera may be obtained. When controlling the camera to converge on the convergence plane, the rotating angles φ of the left and right cameras with respect to z-axis of the original camera may be configured according to equation (19).

$$\varphi = 0.5*ratio \quad (19)$$

Therefore, both virtual cameras and stereo cameras may configure the camera using the separation value sep and the depth of zero-parallax plane con calculated from equations (17) and (18), and thus generating desired and proper stereo images for objects between depth range z1 to z2 in the camera space.

Figure 4:
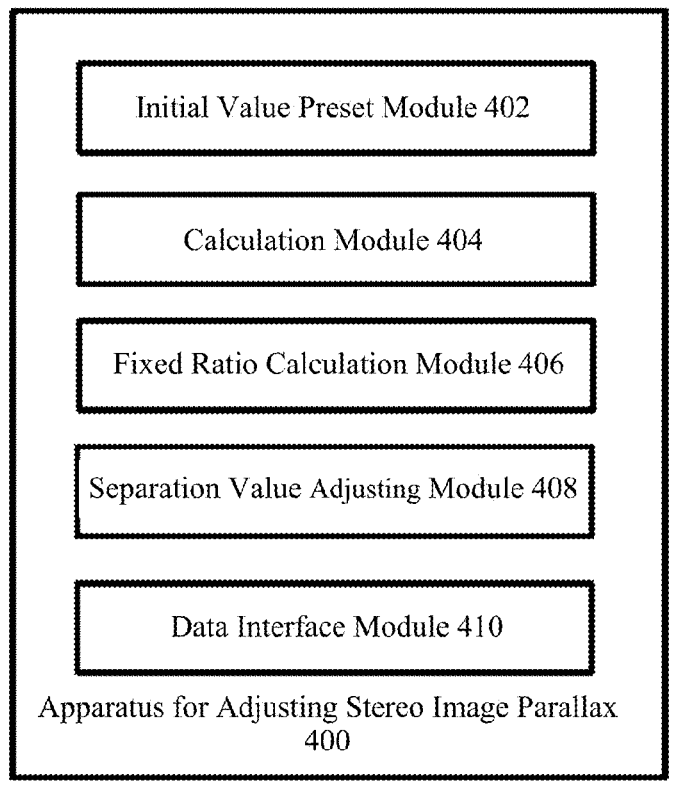
FIG. 4 illustrates a structure diagram of an exemplary apparatus for adjusting stereoscopic image parallax consistent with embodiments of the present disclosure.

FIG. 4 illustrates a structure diagram of an exemplary apparatus for adjusting stereoscopic image parallax consistent with embodiments of the present disclosure. As shown in FIG. 4, when the original camera is a virtual camera, the apparatus 400 for adjusting stereo image parallax may include an initial value preset module 402, a calculation module 404, a fixed ratio calculation 406, a separation value adjusting module 408 and a data interface module 410.

In operation, the initial value preset module 402 may be configured to preset initial values for one or more parameters according to requirements in applications of rendering stereo virtual scenes. The initial values may be assigned once or multiple times. The calculation module 404 may be configured to perform calculations in every self-adaptive processing procedure. During every self-adaptive processing procedure, one of the fixed ratio calculation module 406 and the separation value adjusting module 408 may be configured to execute an assigned algorithm. A user may preset a parameter Algorithm to identify which module to apply during the self-adaptive processing procedure between the fixed ratio calculation module 406 and the separation value adjusting module 408.

Further, the data interface module 410 may be configured to output parameters related to the self-adaptive processing procedure and parameters for adjusting stereo image parallax. The parameters may include D (distance between a viewer to a stereo display screen), e (interocular distance of the viewer), Tw (width of the stereo display window), R (the maximum threshold separation-to-parallax ratio allowed in the self-adaptive algorithm), CS (maximum protruding distance in 3D display effects), BS (maximum recess distance in 3D display effects), z1 (maximum depth of positive-parallax plane), z2 (maximum depth of negative-parallax plane), con (depth of zero-parallax plane), and sep (separation value between the left camera and the right camera).

The parameters may further include: Algorithm which indicates which self-adaptive algorithm to use. The self-adaptive algorithms may include fixed ratio algorithm and separation value adjusting algorithm. State may indicate the current operating status of the algorithm, for example, a phase corresponding to the initial value preset module 402, a phase corresponding to the calculation module 404 and the fixed ratio calculation module 406 (e.g., when running the fixed ratio algorithm), a phase corresponding to the calculation module 404 and the separation value adjusting module 408 (e.g., when running the separation value adjusting algorithm).

Moreover, other parameters may be used, including: TN (the distance between the true near plane and the camera), ratio (a currently applied separation-to-parallax ratio, which is used in the fixed ratio algorithm), currentZ1 (the current maximum depth of positive-parallax plane which is used in the fixed ratio algorithm), oldSep (the initial separation distance between the left camera and the right camera, which is used in the separation value adjusting algorithm), and currentSep (a currently applied separation value, which is used in the separation value adjusting algorithm).

Following descriptions explains how the various modules function in operation.

Figure 5:
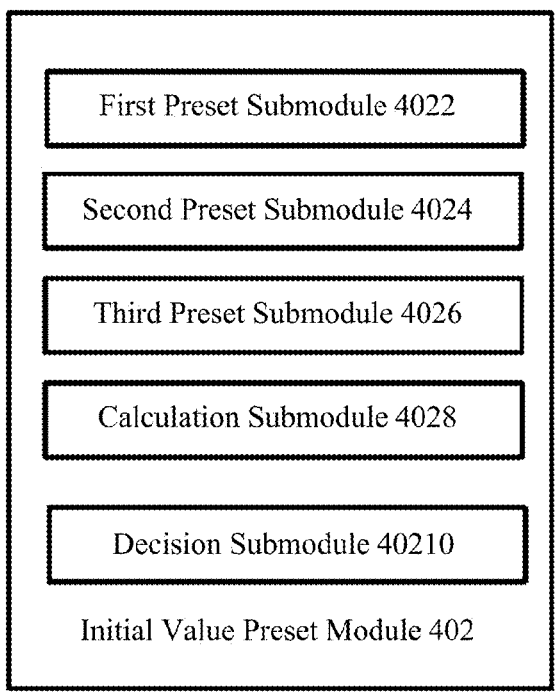
FIG. 5 illustrates a structure diagram of an exemplary initial value preset module consistent with embodiments of the present disclosure.

As shown in FIG. 5, the initial value preset module 402 may further include a first preset submodule 4022, a second preset submodule 4024, a third preset submodule 4026, a calculation submodule 4028 and a decision submodule 40210.

In operation, the first preset submodule 4022 may preset a maximum ratio threshold R according to a received configuration command. R denotes threshold ratio between the separation value sep and the depth of zero-parallax plane con, which may describe an increment of the horizontal angle of view of the left and right cameras and may be the tangent value of the incremented angle. The first preset submodule 4022 may further preset a depth of true near plane denoted as TN. TN may be configured according to different scales of objects within a current projection volume. Generally, in order to maintain a desired 3D control, depth of true near plane TN may be configured to be greater than the average length of the objects in the current projection volume.

The second preset submodule 4024 may be configured to preset a viewing environment according to a received configuration command. Viewing environment parameters may include the distance between a viewer and the display screen denoted as D, the width of the stereo display window where stereo contents are displayed denoted as Tw, the interocular distance denoted as e, the maximum protruding distance denoted as CS, the maximum recess distance denoted as BS, and an original shooting angle of the camera (i.e., angle of view) denoted as θ. Equations (1), (2) and (4) may be used to calculate parallax thresholds Vw1 and Vw2 on the view plane. D, Tw, e and CS are assigned with positive values, and BS is assigned with negative values. After calculation, Vw1 is positive and describes positive parallax, and Vw2 is negative and describes negative parallax.

The third preset submodule 4026 may be configured to preset depth of positive-parallax plane in the camera space denoted as z1 and depth of negative-parallax plane in the camera space denoted as z2, according to a received configuration command. The preset depths of the positive-parallax plane and the negative-parallax plane in the camera space may satisfy the positive and negative parallax thresholds Vw1 and Vw2 in the view plane.

The calculation submodule 4028 may be configured to implement equations (17) and (18) to calculate the depth of zero-parallax plane con, the separation value sep and the separation-to-parallax ratio ratio. The data interface module 410 may be configured to update parameter values after each calculation. The depth of positive-parallax plane z1 in the camera space may be assigned as the current depth. The separation value sep may be stored as an initial/previous separation value sep (i.e., oldSep).

The decision submodule 40210 may be configured to determine whether the separation-to-parallax ratio (sep/con) ratio is less than the preset threshold R. When the separation-to-parallax ratio is greater than R, aspect ratio of objects in generated left and right images may be imbalanced. In this case, the maximum protruding distance CS and the maximum recess distance BS need to be reconfigured, or depth of positive-parallax plane z1 and depth of negative-parallax plane z2 need to be reconfigured.

In addition, the initial value preset module 402 may be further configured to support limiting the separation-to-parallax ratio under the threshold R. That is, when the separation-to-parallax ratio is larger than the threshold R, the threshold R is used as the separation-to-parallax ratio to be applied to equation (17). Using equation (17) and the value of the separation-to-parallax ratio (currently is threshold R) may reverse conduct an expression for calculating a new Vw2. Further, Vw2 may be used to reverse calculate a new maximum recess distance BS according to equation (2) and (4), and then the initial values corresponding to the ratio R may be obtained. Equation (18) may be used to calculate the depth of zero-parallax plane con.

Figure 6:
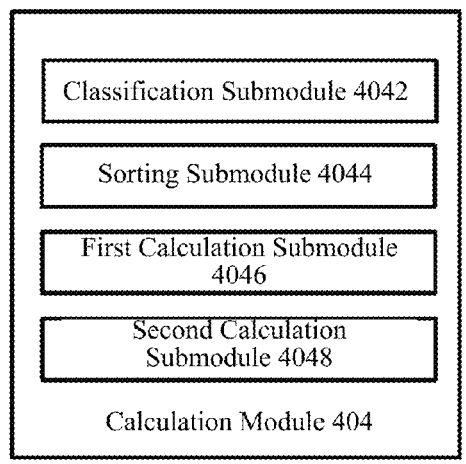
FIG. 6 illustrates a flow chart diagram of an exemplary calculation module consistent with embodiments of the present disclosure.

As shown in FIG. 6, the calculation module 404 may include a classification submodule 4042, a sorting submodule 4044, a first calculation unit 4046, and a second calculation module 4048.

The classification submodule 4042 may be configured to classify and filter objects according to object categories in the scene. The classification criteria may include size, existence duration in the scene (i.e., life span) and importance level in stereoscopic rendering. The importance level of the objects may be assigned by developers or designers. In a virtual scene, by classifying objects into different categories, algorithm implementations may be directed to objects of interest, therefore enhancing processing speed of the algorithms.

Figure 7:
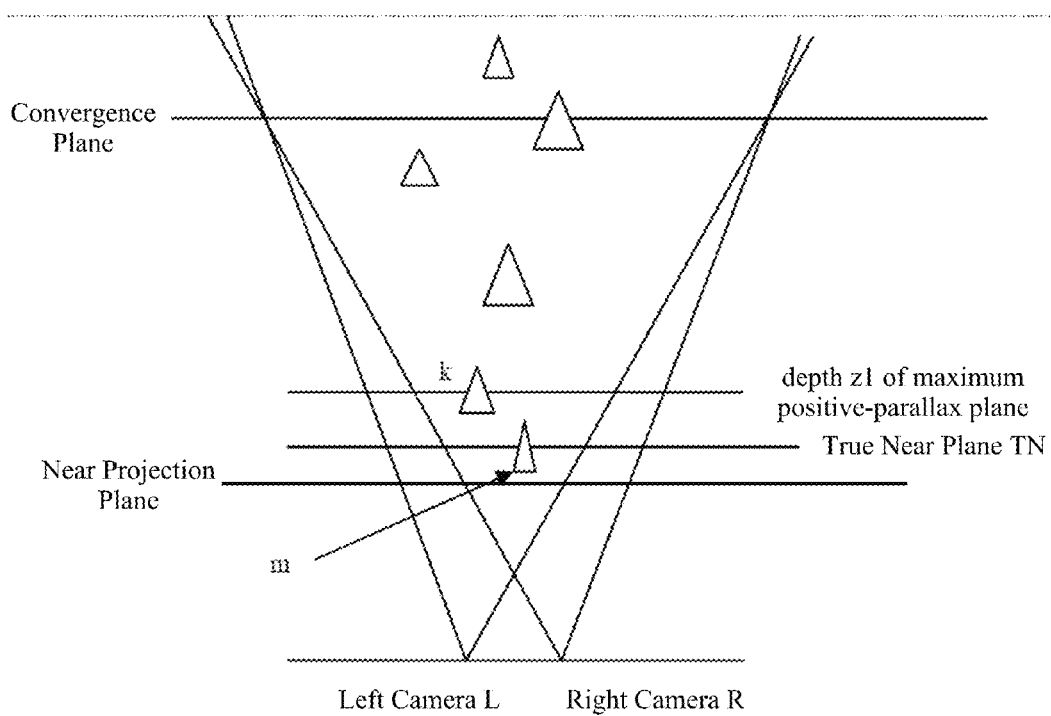
FIG. 7 illustrates principles of excluding objects consistent with embodiments of the present disclosure.

The sorting submodule 4044 may be configured to sort objects within the projection volume, and to exclude objects between the near projection plane and the actual near plane. Conventional 3D rendering may not have concepts of the true near plane. In the disclosed embodiments, as shown in FIG. 7, referring to equation (14), when an object is too close to the near projection plane, the parallax may be too large. When adjusting z1 to recalculate the separation value sep and depth of zero-parallax plane con, the zero-parallax plane would be approaching the near projection plane (i.e., con approaching near).

Further, the protruding effects may only exist for very small objects having positive parallax, for example, the size of the objects may be a few centimeters or in even smaller scale. Whether such display effects are reasonable or not may be related to distributions of object sizes in the scene. When objects in the scene are all bigger than the centimeter scale, it may be undesired that the generated zero-parallax plane is only a few centimeters away from the near projection plane (i.e., difference between con and near is a few centimeters).

A desired and proper configuration may include setting the distance between the zero-parallax plane and the near projection plane (i.e., difference between the values of con and near) to be greater than the average size of the objects in the current projection volume. Therefore, the disclosed embodiments may implement conditional self-adaptive procedures when a closer object appears. In an exemplary embodiment, object m shown in FIG. 7 may be excluded.

The first calculation unit 4046 may be configured to calculate parallax value of an object closest to the camera denoted as tempVw. The second calculation unit 4048 may be configured to calculate depth of an object closest to the camera denoted as tempZ. The computation results from the first calculation module 4046 and the second calculation module 4048 may be used to determine whether the parallax of an object exceeds an initial parallax threshold.

Figure 8:
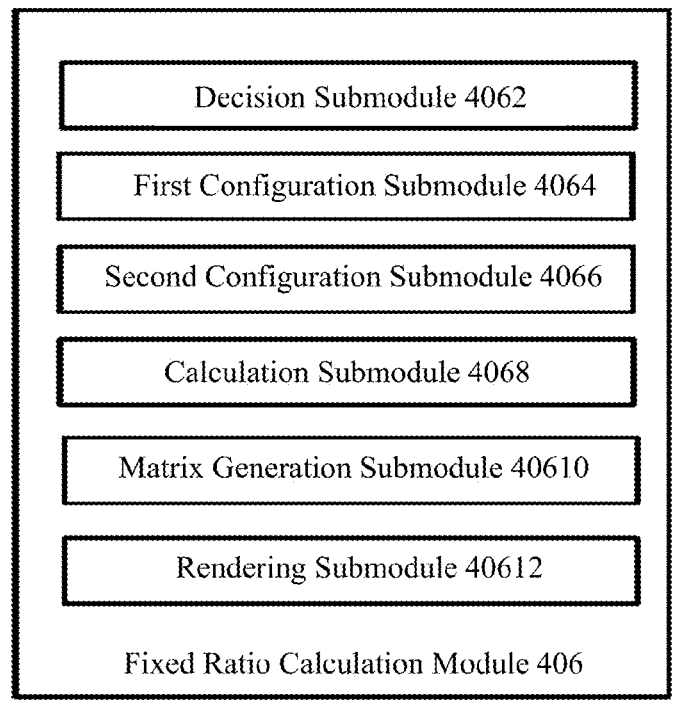
FIG. 8 illustrates a flow chart diagram of an exemplary fixed ratio calculation module consistent with embodiments of the present disclosure.

As shown in FIG. 8, the fixed ratio calculation module 406 may further include a decision submodule 4062, a first configuration submodule 4064, a second configuration submodule 4066, a calculation submodule 4068, a matrix generation module 40610 and a rendering submodule 40612.

The decision submodule 4062 may be configured to determine whether the depth of a closest object is less than a preset maximum depth of positive-parallax plane. When the depth of the closes object is less than the preset maximum depth of positive-parallax plane, the decision submodule 4062 may trigger the first configuration submodule 4064. When the depth of the closest object is greater than the preset maximum depth of positive-parallax plan, the decision submodule 4062 may trigger the second configuration submodule 4066.

Using object m in FIG. 7 as an example, previously configured depth of zero-parallax plane con and separation value sep may cause the parallax of an object to be greater than the maximum recess and maximum protruding thresholds. In this circumstance, the first configuration submodule 4064 may assign the depth of the object tempZ to the current maximum depth of positive-parallax plane denoted as currentZ1. It should be noted that the depth of the object is assigned to the current maximum depth of positive-parallax plane currentZ1 instead of the initial depth of positive-parallax plane z1, because, during the entire procedures of self-adaptive algorithm, parallax adjustment due to the distance change between objects in the scene and the camera may need to reuse the initial value z1 when the distance between the closest object and the camera is not less than z1. Therefore, the initial depth of positive-parallax plane z1 needs to be recorded and saved. Such procedure also demonstrates that the self-adaptive adjustments may use the parallax values as decision criteria.

The second configuration submodule 4066 may be configured to assign the preset initial maximum depth of positive-parallax plane z1 as the current maximum depth of positive-parallax plane currentZ1.

The calculation submodule 4068 may be configured to use the newly assigned currentZ1 to calculate a new depth of zero-parallax plane con and new separation value sep. These calculations may use the separation-to-parallax ratio obtained from the initial value preset module 402, therefore equation (18) may be directly applied to calculate the depth of zero-parallax plane con.

The matrix generation submodule 40610 may be configured to generate mapping matrix for the left camera and the right camera according to the depth of zero-parallax plane con obtained from the calculation submodule 4068 and parameters of the original camera. The rendering submodule 40612 may be configured to use the left camera and the right camera to render the scene.

Figure 9:
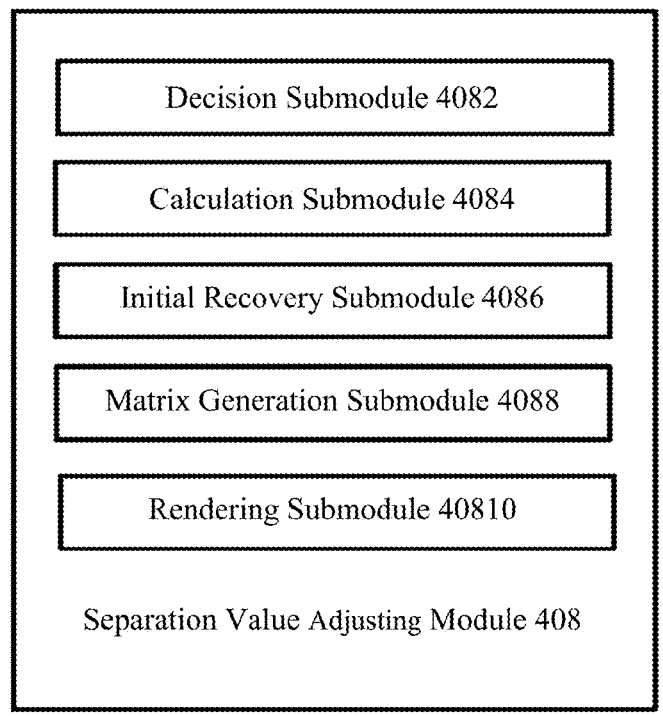
FIG. 9 illustrates a flow chart diagram of an exemplary the separation value sep adjusting calculation module consistent with embodiments of the present disclosure.

As shown in FIG. 9, the separation value adjusting module 408 may include a decision submodule 4082, a calculation submodule 4084, an initial recovery submodule 4086, a matrix generation submodule 4088 and a rendering submodule 40810.

The decision submodule 4082 may be configured to determine whether the depth of the closest object is less than the preset maximum depth of positive-parallax plane. When the depth of the closest object is less than the preset maximum depth of positive-parallax plane, the decision submodule 4082 may trigger the calculation submodule 4084. When the depth of the closest object is greater than the preset maximum depth of positive-parallax plane, the decision submodule 4082 may trigger the initial recovery submodule 4086.

The calculation submodule 4084 may be configured to calculate the separation value sep according to the following equation (20). On the right side of equation (20), parameter con may use the depth of zero-parallax plane con from the initial preset module 402, parameter z may use the depth of the closest object tempZ from the calculation module 404, parameter Vw may use the positive parallax value Vw1 from the initial preset module 402. Equation (20) may be deducted from equation (13).

$$sep = con*U*Vw*z/(-2*near*con + 2*near*z + Vw*near*z) \quad (20)$$

The initial recovery submodule 4086 may be configured to recover the initial the separation value sep when there is no objects closer to the camera than the initial positive-parallax plane.

The matrix generation submodule 4088 may be configured to generate mapping matrix for the left camera and the right camera according to the depth of zero-parallax plane con, current separation value currentSep and parameters of the original camera. The rendering submodule 40810 may be configured to use the left camera and the right camera to render the scene.

Figure 10:
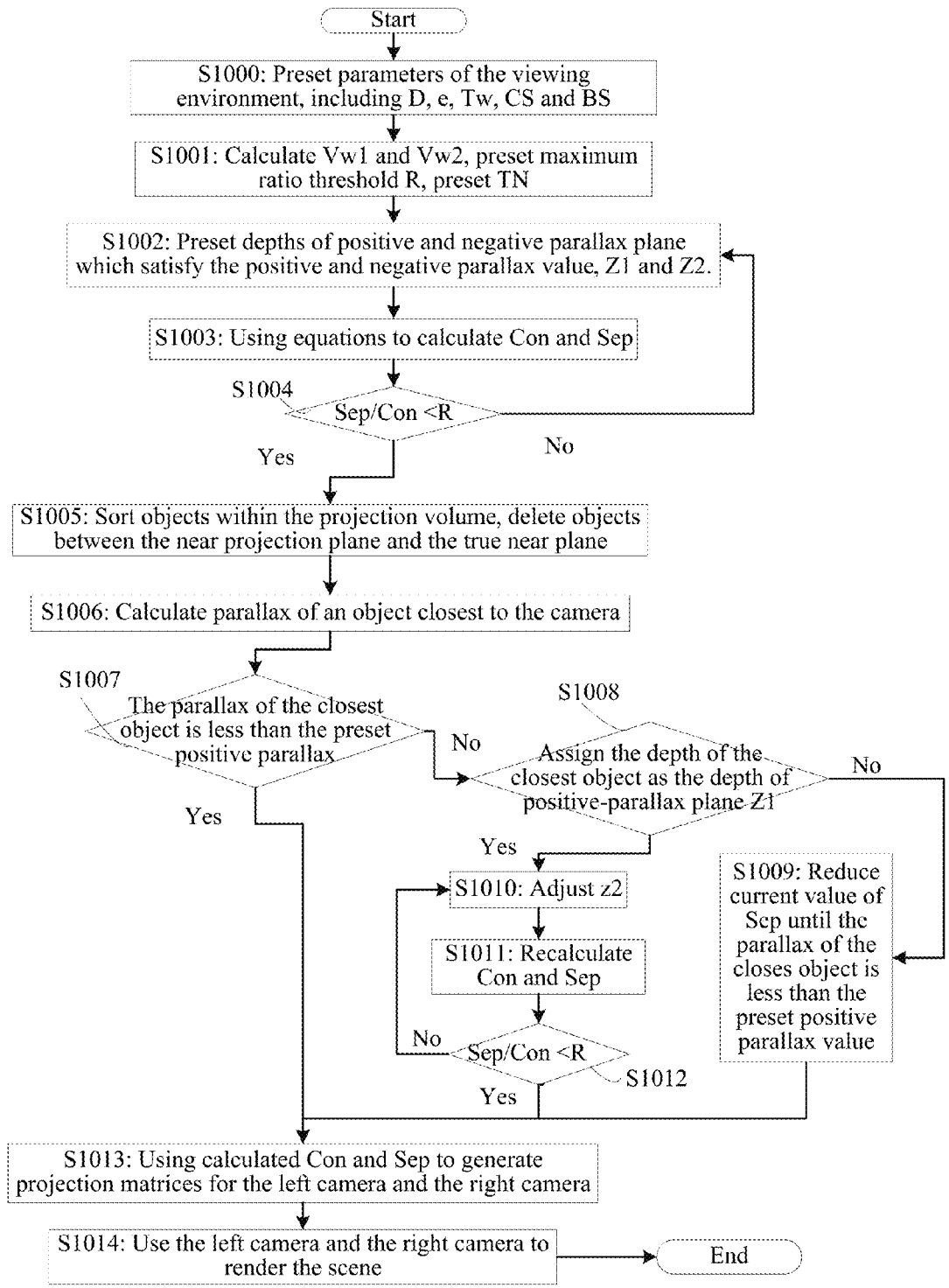
FIG. 10 illustrates a flow chart of another exemplary method for adjusting stereo image parallax consistent with embodiments of the present disclosure.

FIG. 10 illustrates a flow chart of another exemplary method for adjusting stereo image parallax consistent with embodiments of the present disclosure. The exemplary method may be applied to embodiments when the original camera is a virtual camera. First, parameters of a viewing environment may be preset (S1000), including distance between a viewer to a stereo display screen denoted as D, interocular distance of the viewer denoted as e, width of the stereo display window denoted as Tw, maximum protruding distance in 3D display effects denoted as CS and maximum recess distance in 3D display effects denoted as BS.

Further, equations (1), (2) and (4) may be used to calculate parallax thresholds on the view plane, including maximum positive parallax on the view plane denoted as Vw1 and maximum negative parallax on the view plane denoted as Vw2. Meanwhile, a preset threshold ratio R between the separation value and the depth of zero-parallax plane may be configured. In addition, depth of true near plane, denoted as TN, may be configured. The depth of true near plane TN may be configured to be greater than the average length of objects in the current projection volume (S1001).

Depth of positive-parallax plane z1 and depth of negative-parallax plane z2 in the camera space may be configured to satisfy the positive and negative parallax thresholds Vw1 and Vw2 in the view plane (S1002). Equations (17) and (18) to may be applied to calculate depth of zero-parallax plane con and separation value between the left and right cameras sep (S1003).

Further, the separation-to-parallax ratio may be calculated and compared with the preset threshold R (S1004). When the separation-to-parallax ratio is larger than the threshold R, aspect ratio of generated stereo images may be imbalanced. Therefore, in some embodiments, the process may return to step S1002 to reconfigure the depth of positive-parallax plane z1 and the depth of negative-parallax plane z2. In some other embodiments, the process may return to step S1000 to reconfigure maximum protruding distance CS and maximum recess distance BS.

When the calculated ratio is less than the preset threshold R, all objects in the projection volume may be sorted (S1005) and objects between the near projection plane and the true near plane may be directly excluded. When there are objects closer to the camera than the near projection plane, or when the camera moves in a scene space and the positional relationship between the camera and objects in the scene changes, the disclosed embodiments may employ self-adaptive algorithms to adjust depth of zero-parallax plane and the separation value in real-time, thus ensuring desired display effects of generated stereo contents.

The parallax value of an object closest to the camera may be calculated (S1006). When the parallax value of the closest object is less than the preset positive parallax threshold, the current depth of zero-parallax plane con and the current separation value sep may be used to generate projection matrices for the left camera and the right camera (S1013). The current scene may be rendered using the left camera and the right camera (S1014).

When the parallax value of the closest object is greater than the preset positive parallax threshold, a self-adaptive algorithm may be employed to adjust the parameters. The process may determine whether to assign the depth of the closes object as the new depth of positive-parallax plane (S1008).

In some embodiments, the depth of positive-parallax plane z1 may be unchanged. The separation value sep may be reduced until the parallax value of the closest object is less than the preset positive parallax value (S1009). Optionally, the equation (20) may be used to adjust the separation value by applying the depth of the closest object as z and applying the preset positive parallax threshold as Vw to the equation. Further, the adjusted separation value may be used to generate the projection matrices in step S1013 and for further scene rendering in step S1014.

In other embodiments, the depth of positive-parallax plane z1 may be reconfigured using the depth of the closest object. In one embodiment, the depth of negative-parallax plane z2 may also be adjusted (S1010). According to the reconfigured z1 and z2, a new depth of zero-parallax plane and a new separation value may be obtained (S1011). The separation-to-parallax ratio may be calculated and compared with the threshold ratio R (S1012). When the calculated ratio is less than the threshold ratio R, the process may return to step S1010 to reset the depth of negative-parallax plane z2. When the calculated ratio is less than the threshold ratio R, the process may continue to step S1013 to generate projection matrices.

In another example, after assigning the depth of the closest object as the depth of positive-parallax plane z1, equation (18) may be used to calculate the new depth of zero-parallax plane con. The threshold ratio R may be used to calculate the new separation value sep according to equation sep=ratio*con. Further, the process may proceed to step S1013 with the newly updated sep and con.

It should be noted that Steps S1008 to S1002 describes one type of self-adaptive method when dealing with objects beyond the threshold and Step S1009 describes another type of self-adaptive method. The developer may choose different self-adaptive method to process different types of objects.

Figure 11:
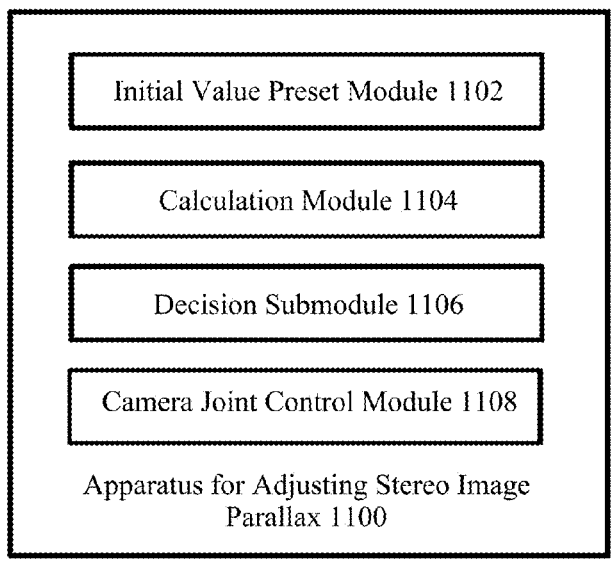
FIG. 11 illustrates a block diagram of another exemplary apparatus for adjusting stereoscopic image parallax consistent with embodiments of the present disclosure.

Previous embodiments use virtual camera as an example. In other embodiments, the original camera may be a stereo camera. FIG. 11 illustrates a block diagram of an exemplary apparatus for adjusting stereoscopic image parallax consistent with embodiments of the present disclosure. As shown in FIG. 11, when the original camera is stereo camera, an exemplary apparatus for adjusting stereo image parallax may include an initial value preset module 1002, a calculation module 1004, a decision module 1006, and a camera joint control module 1008.

Figure 12:
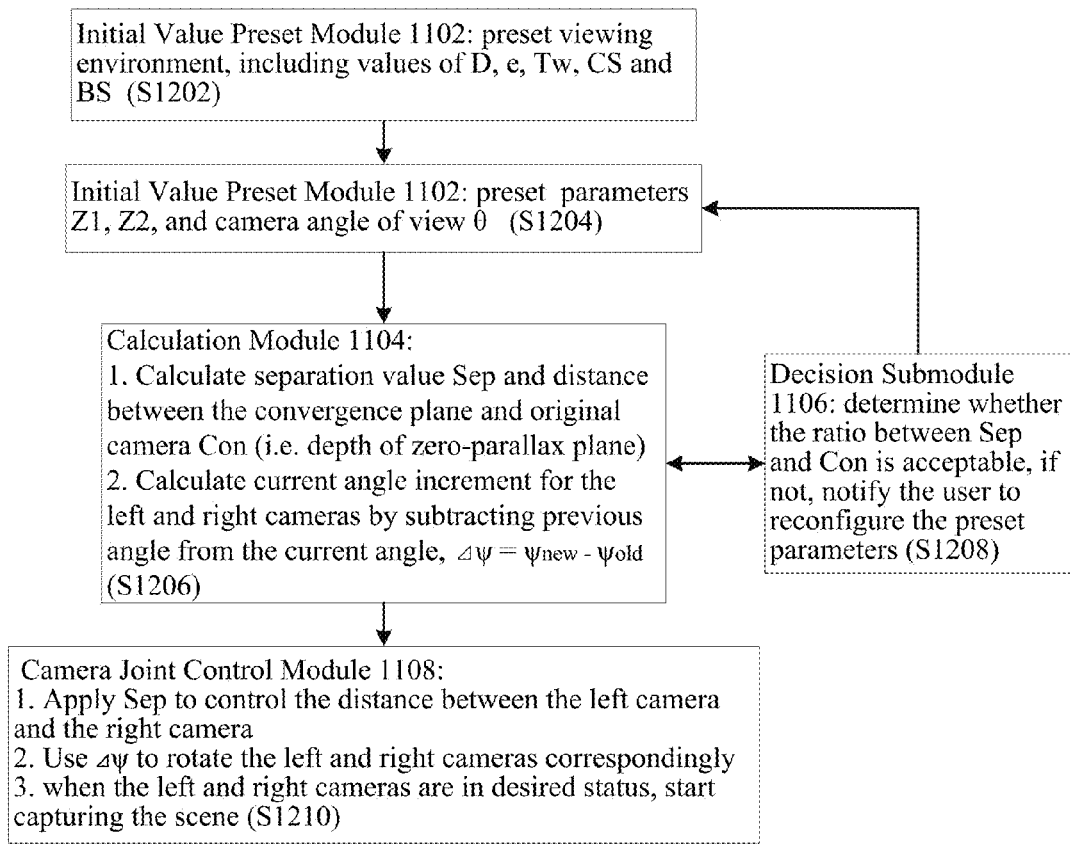
FIG. 12 illustrates a flow chart of another exemplary method for adjusting stereo image parallax consistent with embodiments of the present disclosure.

FIG. 12 illustrates a flow chart of an exemplary method for adjusting stereo image parallax consistent with embodiments of the present disclosure. The exemplary method may incorporate the modules in the exemplary parallax adjusting apparatus 1110 shown in FIG. 11.

In operation, the initial value preset module 1101 may configure parameters of a viewing environment (S1202). The viewing environment parameters may include distance between a viewer to a stereo display screen denoted as D, interocular distance of the viewer denoted as e, width of the stereo display window denoted as Tw, maximum protruding distance in 3D display effects denoted as CS and maximum recess distance in 3D display effects denoted as BS.

Further, the initial value preset module 1101 may also configure depth of positive-parallax plane z1, depth of negative-parallax plane z2 in the camera space, preset threshold ratio R and angle of view of the camera θ (S1204).

The calculation module 1104 may be configured to calculate separation value sep, distance between the convergence plane and original camera con (i.e., depth of zero-parallax plane), and the separation-to-parallax ratio. Further, the calculation module 1104 may calculate an angle increment for the left and right cameras by subtracting previously calculated angle from the current angle, $\Delta\psi=\psi new-\psi old$. (S1206)

The decision submodule 1106 may determine whether the separation-to-parallax ratio is acceptable (e.g., less than the threshold ratio R). When the separation-to-parallax ratio is larger than the threshold R, the decision module 1106 may notify the user to reconfigure the preset parameters (S1208).

The camera joint control module 1108 may apply the separation value sep to adjust the distance between the left camera and the right camera. Further, the camera joint control module 1108 may control and rotate the left and right cameras according to their corresponding $\Delta\psi$ When the left and right cameras are adjusted to desired status, the stereo camera may be ready to start shooting and capture the scene (S1210).

In the disclosed embodiments, when viewing environment parameters are given (e.g., a set of D, e, Tw, CS and BS), equations (1), (2), (4) and (13) may be applied to obtain Vw1 and Vw2 as positive and negative parallax thresholds. In this way, the preset desired maximum protruding distance and maximum recess distance may be converted to parallax thresholds Vw1 and Vw2 on the view plane. Vw1 and Vw2 may also describe expected depth effect when displaying the captured scene.

Further, depth of positive-parallax plane z1, depth of negative-parallax plane z2 and angle of view θ of the camera that satisfy the preset parallax thresholds may be configured. When three thresholds Vw1, Vw2 and R are given, a desired way to set parallax in the scene may be obtained. That is, desired parameters (e.g., depth of zero-parallax plane con and separation value sep) to control the camera may be obtained.

The disclosed embodiments may preset a desired parallax range. When the camera moves, parallax value of an object closest to the camera may be calculated. According to the parallax of the closest object, depth of zero-parallax plane and separation value of the left and right cameras may be adjusted in real-time. Therefore, parallax value of objects in the scene may be maintained in the preset parallax range, and desired stereo images may be generated to obtain desired 3D display effects.

Figure 13:
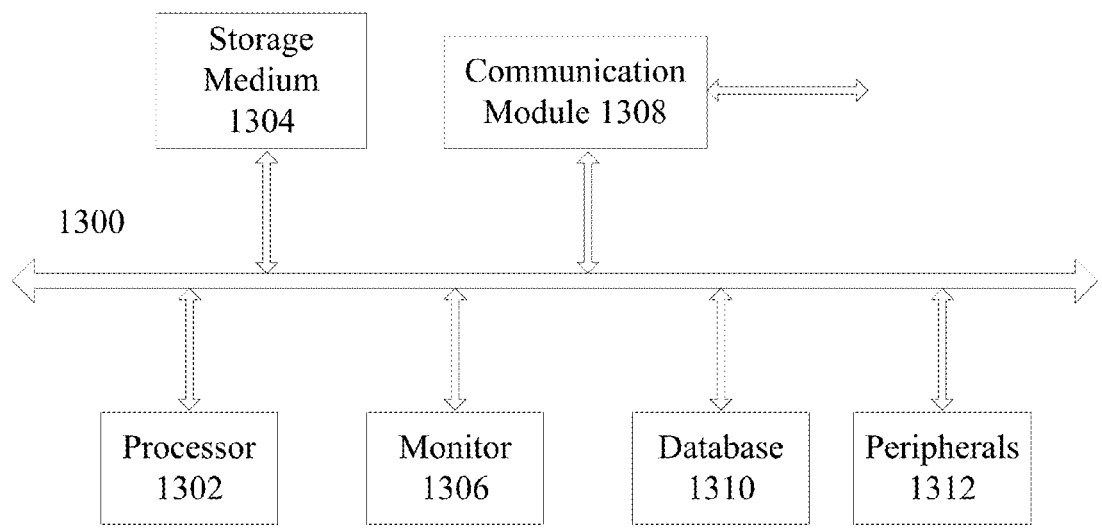
FIG. 13 illustrates a structural diagram of an exemplary environment incorporating various embodiments of the present disclosure.

The disclosed embodiments may be implemented by hardware, software or a combination of hardware and software. In various embodiments, an exemplary apparatus/method for adjusting stereoscopic image parallax may be implemented on any appropriate computing platform. FIG. 13 shows a block diagram of an exemplary computing system 1300 capable of implementing the exemplary apparatus and method. The computing system 1300 may include a processor 1302, a storage medium 1304, a monitor 1306, a communication module 1308, a database 1310, and peripherals 1312. Certain devices may be omitted and other devices may be included.

Processor 1302 may include any appropriate processor or processors. Further, processor 1302 can include multiple cores for multi-thread or parallel processing. Storage medium 1304 may include memory modules, such as ROM, RAM, and flash memory modules, and mass storages, such as CD-ROM, U-disk, hard disk, etc. Storage medium 1304 may store computer programs for implementing various processes, when executed by processor 1302.

Further, monitor 1306 may present various types of information to a user, such as user interface, menu options, images, videos, etc. Monitor 1306 may be a stereoscopic display. Peripherals 1312 may include I/O devices such as keyboard, mouse, touch screen, keys on a digital camera, etc. Communication module 1308 may include network devices for establishing connections through a wireless or wired communication network. Database 1310 may include one or more databases for storing certain data and for performing certain operations on the stored data, such as database searching.

In various embodiments, the disclosed modules for the exemplary system as depicted above can be configured in one device or configured in multiple devices as desired. The modules disclosed herein can be integrated in one module or in multiple modules for processing messages. Each of the modules disclosed herein can be divided into one or more sub-modules, which can be recombined in any manners.

The disclosed embodiments are examples only. One of ordinary skill in the art would appreciate that suitable software and/or hardware (e.g., a universal hardware platform) may be included and used to perform the disclosed methods. For example, the disclosed embodiments can be implemented by hardware only, which alternatively can be implemented by software only or a combination of hardware and software. The software can be stored in a storage medium. The software can include suitable commands to enable any client device (e.g., including a digital camera, a smart terminal, a server, or a network device, etc.) to implement the disclosed embodiments.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A method for adjusting stereoscopic image parallax, comprising:
    providing an original camera;
    presetting a depth range of a scene space, wherein the scene space is corresponding to the original camera;
    configuring preset viewing environment parameters for displaying stereoscopic images of a scene in the scene space, including presetting a depth range of an actual view space;
    establishing a mapping relationship between the depth range of the actual view space and the depth range of the scene space;
    according to the mapping relationship, the preset viewing environment parameters and the scene space, calculating camera parameters for adjusting the stereoscopic image parallax;
    based on the camera parameters, adjusting the original camera to capture the scene; and
    generating the stereoscopic images of the scene,
    wherein:
    the depth range of the scene space is preset by a depth of positive-parallax plane z1 and a depth of negative-parallax plane z2;
    a left camera and a right camera are obtained by respectively moving the original camera to two sides in horizontal direction; and
    calculating the camera parameters further comprises:
    a first calculation step including: based on the preset viewing environment parameters, the preset depth of the positive-parallax plane z1, the preset depth of the negative-parallax plane z2 and current camera parameters, calculating a separation value between the left camera and the right camera sep, a depth of zero-parallax plane con, and a separation-to-parallax ratio ratio between the separation value sep and the depth of the zero-parallax plane con;
    a second calculation step including: keeping one of ratio and sep unchanged, based on a depth of a target object closest to the original camera in a current scene, calculating a new separation value between the left camera and the right camera and a new depth of the zero-parallax plane, such that the current scene is captured using the new separation value and the new depth of the zero-parallax plane.

2. The method according to claim 1, wherein:
    the preset viewing environment parameters includes a distance D between a viewer and the stereoscopic images corresponding to a stereo display window, an interocular distance e of the viewer, a width of the stereo display window Tw, and the depth range of the actual view space; and the depth range of the actual view space is preset by a maximum protruding distance CS and a maximum recess distance BS of the stereoscopic images.

3. The method according to claim 2, wherein the first calculation step further comprises:
using a first preset algorithm to calculate a positive parallax value on the stereo display window w1 and a negative parallax value on the stereo display window w2 based on the preset viewing environment parameters, wherein: w1 is positively correlated with at least one of CS and e, w1 is negatively correlated with D−CS, w2 is positively correlated with at least one of BS and e, and w2 is negatively correlated with D+BS; and
using a second preset algorithm to calculate a positive parallax value on the view plane Vw1 and a negative parallax value on the view plane Vw2 based on w1 and w2, wherein: Vw1 is positively correlated with w1, Vw1 is negatively correlated with Tw, Vw2 is positively correlated with w2, and Vw2 is negatively correlated with Tw.

4. The method according to claim 3, wherein the first calculation step further comprises:
provided that U denotes the width of a near projection plane of the original camera in the observation space, near denotes a distance between the near projection plane of the original camera and the coordinate origin in the observation space, z denotes depth of a point in the camera space, and Vw denotes a parallax value of the point on the view plane,
using a third preset algorithm to calculate the separation-to-parallax ratio ratio according to current camera parameters, z1 and z2, wherein the third preset algorithm uses the equation $$\text{ratio} = \frac{U}{\text{near} * \left( \frac{2*(z2-z1)}{Vw1*z1 - Vw2*z2} - 1 \right)};$$

using a fourth preset algorithm to calculate the depth of the zero-parallax plane con, wherein the fourth preset algorithm uses the equation $$\text{con} = \frac{0.5 * Vw * U * z}{\text{near} * \text{ratio}} + 0.5 * Vw * z + z;$$

and
using a fifth preset algorithm to calculate the separation value between the left camera and the right camera sep based on ratio and con, wherein the fifth preset algorithm uses the equation $$\text{ratio} = \frac{\text{sep}}{\text{con}}.$$

5. The method according to claim 1, wherein the second calculation step further comprises:
filtering a plurality of objects in a current scene according to object classifications;
sorting the objects within a projection volume of the original camera according to distances between the objects and the original camera;
excluding objects between a near projection plane of the original camera and a preset true near plane;
determining the target object closest to the original camera; and
calculating the depth of the target object.

6. The method according to claim 5, wherein:
provided that U denotes the width of the near projection plane of the original camera in the observation space, near denotes a distance between the near projection plane of the original camera and the coordinate origin in the observation space, z denotes depth of a point in the camera space, and Vw denotes a parallax value of the point on the view plane,
the scene is a virtual scene, the original camera is a virtual camera used to render the virtual scene for generating the stereoscopic images of the virtual scene, and
the second calculation step further includes:
comparing the depth of the target object and the preset depth of the positive-parallax plane z1;
when the depth of the target object is less than z1, keeping ratio unchanged, assigning the depth of the target object as the preset depth of the positive-parallax plane, and according to a fourth preset algorithm and a fifth preset algorithm, calculating the new separation value between the left and right cameras and the new depth of the zero-parallax plane; and
when the depth of the target object is greater than z1, keeping ratio unchanged, based on z1, the fourth preset algorithm and the fifth preset algorithm, calculating the new separation value between the left and right cameras and the new depth of the zero-parallax plane;
wherein the fourth preset algorithm uses the equation $$\text{con} = \frac{0.5 * Vw * U * z}{\text{near} * \text{ratio}} + 0.5 * Vw * z + z$$

and the fifth preset algorithm uses the equation $$\text{ratio} = \frac{\text{sep}}{\text{con}}.$$

7. The method according to claim 5, wherein:
the scene is a virtual scene, the original camera is a virtual camera used to render the virtual scene for generating the stereoscopic images of the virtual scene, and
the second calculation step further includes:
comparing the depth of the target object and the preset depth of the positive-parallax plane z1;
when the depth of the target object is less than z1, keeping sep unchanged, using the depth of the target object as the preset depth of the positive-parallax plane, and according to a sixth preset algorithm, calculating the new depth of the zero-parallax plane to render the virtual scene; and
when the depth of the target object is greater z1, directly using the separation value sep and the depth of the zero-parallax plane con to render the virtual scene.

8. The method according to claim 5, wherein:
the scene is a real scene, the original camera is a stereo camera for capturing stereoscopic images of the real scene; and
the second calculation step further includes:
using a seventh preset algorithm to calculate a rotating angle between the left and right cameras and z-axis of the original camera based on the separation-to-parallax ratio, wherein the rotating angle is positively correlated with the separation-to-parallax ratio;

comparing the depth of the target object with the preset depth of the positive-parallax plane z1; and when the depth of the target object is less than z1, keeping sep unchanged, using the depth of the target object as the preset depth of the positive-parallax plane, according to a fifth preset algorithm and a sixth preset algorithm, calculating a new separation-to-parallax ratio and the new depth of the zero-parallax plane;

calculating a new rotating angle according to the seventh preset algorithm; and adjusting the left and right cameras according to the new rotating angle.

9. The method according to claim 1, before the second calculation step, further comprising:

comparing the separation-to-parallax ratio with a preset ratio threshold;

when the separation-to-parallax ratio is less than the preset ratio threshold, permitting to perform the second calculation step; and when the separation-to-parallax ratio is greater than the preset ratio threshold, generating a reminder for a user to reconfigure at least one of the preset viewing environment parameters, the preset depth of the positive-parallax plane and the preset depth of the negative-parallax plane.

10. An apparatus for adjusting stereoscopic image parallax, comprising:

a mapping relationship establishing unit configured to establish a mapping relationship between a depth range of an actual view space and a depth range of a scene space, wherein:

an original camera is provided to capture a scene in the scene space, according to the mapping relationship, camera parameters are calculated for adjusting the stereoscopic image parallax, based on the camera parameters, the original camera is adjusted to capture the scene such that stereoscopic images of the scene are correspondingly generated, and the depth range of the scene space is preset by a depth of positive-parallax plane z1 and a depth of negative-parallax plane z2, and any portions of objects located between the positive-parallax plane z1 and the negative-parallax plane z2 in the scene space are rendered to satisfy requirements for maximum protruding and maximum recess display effects; and a first calculation unit configured to: based on preset viewing environment parameters, the preset depth of the positive-parallax plane z1, the preset depth of the negative-parallax plane z2 and current camera parameters, calculate a separation value between the left camera and the right camera sep, a depth of zero-parallax plane con, and a separation-to-parallax ratio ratio between the separation value sep and the depth of the zero-parallax plane con; and a second calculation unit configured to: keeping one of ratio and sep unchanged, based on a depth of a target object closest to the original camera in a current scene, calculate a new separation value between the left camera and the right camera and a new depth of the zero-parallax plane, such that the current scene is captured using the new separation value and the new depth of the zero-parallax plane;

wherein: the depth range of the scene space is preset by z1 and z2; and the left camera and the right camera is obtained by respectively moving the original camera to two sides in horizontal direction.

11. The apparatus according to claim 10, wherein:

the preset viewing environment parameters includes a distance D between a viewer and the stereoscopic images corresponding to a stereo display window, an interocular distance e of the viewer, a width of the stereo display window Tw, and the depth range of the actual view space; and the depth range of the actual view space is preset by a maximum protruding distance CS and a maximum recess distance BS of the stereoscopic images.

12. The apparatus according to claim 11, wherein the first calculation unit further comprises:

a first parallax calculation unit configured to apply a first preset algorithm to calculate a positive parallax value on the stereo display window w1 and a negative parallax value on the stereo display window w2 based on the preset viewing environment parameters, wherein: w1 is positively correlated with at least one of CS and e, w1 is negatively correlated with D−CS, w2 is positively correlated with at least one of BS and e, and w2 is negatively correlated with D+BS; and a second parallax calculation unit configured to apply a second preset algorithm to calculate a positive parallax value on the view plane Vw1 and a negative parallax value on the view plane Vw2 based on w1 and w2, wherein: Vw1 is positively correlated with w1, Vw1 is negatively correlated with Tw, Vw2 is positively correlated with w2, and Vw2 is negatively correlated with Tw.

13. The apparatus according to claim 12, wherein the first calculation unit further comprises:

provided that U denotes the width of a near projection plane of the original camera in the observation space, near denotes a distance between the near projection plane of the original camera and the coordinate origin in the observation space, z denotes depth of a point in the camera space, and Vw denotes a parallax value of the point on the view plane, a ratio calculation unit configured to apply a third preset algorithm to calculate the separation-to-parallax ratio ratio according to current camera parameters, z1 and z2, wherein the third preset algorithm uses the equation $$\text{ratio} = \frac{U}{\text{near}*\left(\frac{2*(z2-z1)}{Vw1*z1 - Vw2*z2} - 1\right)};$$

a depth calculation unit configured to apply a fourth preset algorithm to calculate the depth of the zero-parallax plane con, wherein the fourth preset algorithm uses the equation $$\text{con} = \frac{0.5*Vw*U*z}{\text{near}*\text{ratio}} + 0.5*Vw*z + z;$$

and
a separation calculation unit configured to apply a fifth preset algorithm to calculate the separation value between the left camera and the right camera sep based on ratio and con, wherein the fifth preset algorithm uses the equation $$ratio = \frac{sep}{con}.$$

14. The apparatus according to claim 10, wherein the second calculation unit further comprises:
a classification unit configured to filter a plurality of objects in a current scene according to object classifications;
an object exclusion unit configured to sort the objects within a projection volume of the original camera according to distances between the objects and the original camera, and to exclude objects between a near projection plane of the original camera and a preset true near plane; and
an object depth calculation unit configured to determine the target object closest to the original camera and to calculate the depth of the target object.

15. The apparatus according to claim 14, wherein:
provided that U denotes the width of the near projection plane of the original camera in the observation space, near denotes a distance between the near projection plane of the original camera and the coordinate origin in the observation space, z denotes depth of a point in the camera space, and Vw denotes a parallax value of the point on the view plane,
the scene is a virtual scene, the original camera is a virtual camera used to render the virtual scene for generating the stereoscopic images of the virtual scene, and the second calculation unit further comprises:
a comparison unit configured to compare the depth of the target object and the preset depth of the positive-parallax plane z1; and
a secondary calculation unit configured to:
when the depth of the target object is less than z1, keep ratio unchanged, assign the depth of the target object as the preset depth of the positive-parallax plane, and according to a fourth preset algorithm and a fifth preset algorithm, calculate the new separation value between the left and right cameras and the new depth of the zero-parallax plane; and
when the depth of the target object is greater than z1, keeping ratio unchanged, and based on z1, the fourth preset algorithm and the fifth preset algorithm, calculate the new separation value between the left and right cameras and the new depth of the zero-parallax plane;
wherein the fourth preset algorithm uses the equation $$con = \frac{0.5 * Vw * U * z}{near * ratio} + 0.5 * Vw * z + z;$$

and the fifth preset algorithm uses the equation $$ratio = \frac{sep}{con}.$$

16. The apparatus according to claim 14, wherein:
the scene is a virtual scene, the original camera is a virtual camera used to render the virtual scene for generating the stereoscopic images of the virtual scene, and
the second calculation unit further comprises
a comparison unit configured to compare the depth of the target object and the preset depth of the positive-parallax plane z1; and
a secondary calculation unit configured to
when the depth of the target object is less than z1, keep sep unchanged, use the depth of the target object as the preset depth of the positive-parallax plane, and according to a sixth preset algorithm, calculate the new depth of the zero-parallax plane to render the virtual scene; and
when the depth of the target object is greater than z1, directly use the separation value sep and the depth of the zero-parallax plane con to render the virtual scene.

17. The apparatus according to claim 5, wherein:
the scene is a real scene, the original camera is a stereo camera for capturing stereoscopic images of the real scene; and
the second calculation unit further comprises:
an angle calculation unit configured to use a seventh preset algorithm to calculate a rotating angle between the left and right cameras and z-axis of the original camera based on the separation-to-parallax ratio, and to compare the depth of the target object and the preset depth of the positive-parallax plane z1, wherein the rotating angle is positively correlated with the separation-to-parallax ratio; and
a secondary calculation unit configured to: when the depth of the target object is less z1,
keep sep unchanged, use the depth of the target object as the preset depth of the positive-parallax plane;
calculate a new separation-to-parallax ratio and the new depth of the zero-parallax plane according to the fifth preset algorithm and the sixth preset algorithm; and
calculate a new rotating angle according to the seventh preset algorithm, wherein the left and right cameras are adjusted according to the new rotating angle.

18. The apparatus according to claim 10, further comprising a reminder unit configured to:
compare the separation-to-parallax ratio and a preset ratio threshold,
permit the second calculation unit to operate when the separation-to-parallax ratio is less than the preset ratio threshold; and
when the separation-to-parallax ratio is greater than the preset ratio threshold, generate a reminder for a user to reconfigure at least one of the preset viewing environment parameters, the preset depth of the positive-parallax plane and the preset depth of the negative-parallax plane.

* * * * *